United States Patent
Zalevsky et al.

(10) Patent No.: US 7,800,683 B2
(45) Date of Patent: Sep. 21, 2010

(54) OPTICAL METHOD AND SYSTEM FOR ENHANCING IMAGE RESOLUTION

(75) Inventors: Zeev Zalevsky, Rosh HaAyin (IL); Jonathan Solomon, Herzelia (IL)

(73) Assignee: Xceed Imaging Ltd., Rosh Haayin (IL)

( * ) Notice: Subject to any disclaimer, the term of this patent is extended or adjusted under 35 U.S.C. 154(b) by 958 days.

(21) Appl. No.: 10/556,385

(22) PCT Filed: May 13, 2004

(86) PCT No.: PCT/IL2004/000410
§ 371 (c)(1), (2), (4) Date: Sep. 5, 2006

(87) PCT Pub. No.: WO2004/102958
PCT Pub. Date: Nov. 25, 2004

(65) Prior Publication Data
US 2007/0040828 A1 Feb. 22, 2007

Related U.S. Application Data

(60) Provisional application No. 60/469,816, filed on May 13, 2003.

(51) Int. Cl.
*H04N 5/225* (2006.01)
(52) U.S. Cl. ........................ 348/340; 348/335
(58) Field of Classification Search .................. 348/267, 348/291; 359/204.5, 558
See application file for complete search history.

(56) References Cited

U.S. PATENT DOCUMENTS

| | | |
|---|---|---|
| 2002/0075990 A1 | 6/2002 | Lanza et al. |
| 2002/0105725 A1 | 8/2002 | Sweatt et al. |
| 2002/0122254 A1* | 9/2002 | Gluckstad ............... 359/559 |
| 2005/0174573 A1* | 8/2005 | Harvey et al. ........... 356/328 |

FOREIGN PATENT DOCUMENTS

| | | |
|---|---|---|
| WO | WO 98/46007 | 10/1998 |
| WO | WO 00/59206 | 10/2000 |

(Continued)

OTHER PUBLICATIONS

Riesenberg, R et al.,"Opto-micromechanical Super Resolution Detector System"; Proc. SPIE 3737, pp. 367-383, 1999.

(Continued)

*Primary Examiner*—Tuan Ho
*Assistant Examiner*—Jason A Flohre
(74) *Attorney, Agent, or Firm*—Browdy and Neimark, PLLC

(57) ABSTRACT

A method and system are presented for imaging an object with image resolution for at least a part of the object exceeding by a predetermined factor a geometrical resolution defined by a detector pixel array. A predetermined aperture coding is applied to the wavefront of a light signal indicative of at least a part of the object to be imaged with the enhanced resolution, while propagating towards the detector pixel array. The aperture coding is predetermined in accordance with aliasing occurring in the detector plane and such as to provide orthogonality of spectral data indicative of a sampled output of the detector, to thereby enable using the aperture code to reconstruct the image of said at least part of the object with the resolution enhanced by said factor.

54 Claims, 13 Drawing Sheets

FOREIGN PATENT DOCUMENTS

WO      WO 0059206 A1 * 10/2000

OTHER PUBLICATIONS

Zalevsky, Z et al., "Understanding superresolution in aligner space"; J. Opt. Soc. Am. A/vol. 17, No. 12, Dec. 2000.

Goodman, J., "Introduction to Fourier Optics"; Chapter 5 Wave-Optics Analysis of Coherent Optical Systems; McGraw-Hill, Singapore, International $2^{nd}$ Edition, pp. 101-104, 1996.

Zalevsky, Z et al., "Optical implementation of code division multiplexing for super resolution. Part I. Spectroscopic method"; Optics Communications 195, North-Holland Publishing Co. Amsterdam, NL,pp. 93-100, Aug. 1, 2001.

Zalevsky, Z et al., "Pulse amplitude modulation masks for incoherent super resolution"; Optics Communications 177, North-Holland Publishing Co. Amsterdam, NL, Apr. 15, 2000, pp. 149-155.

Zalevsky, Z et al., "Super resolution optical systems for objects with finite sizes", Optics Communications 163; North-Holland Publishing Co. Amsterdam, NL, May 1, 1999, pp. 79-85.

* cited by examiner

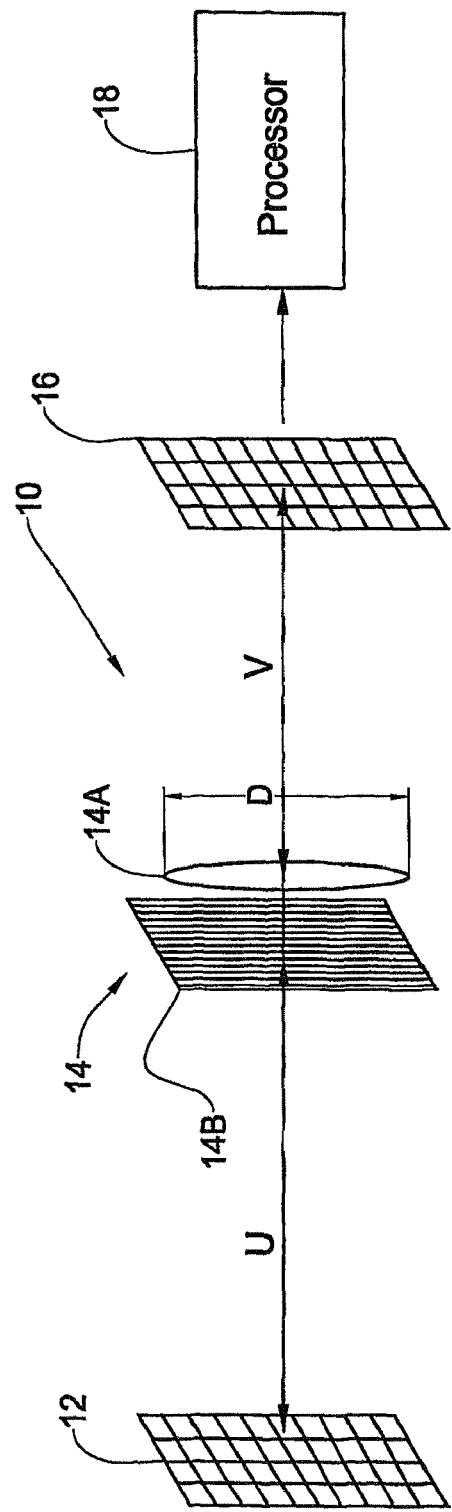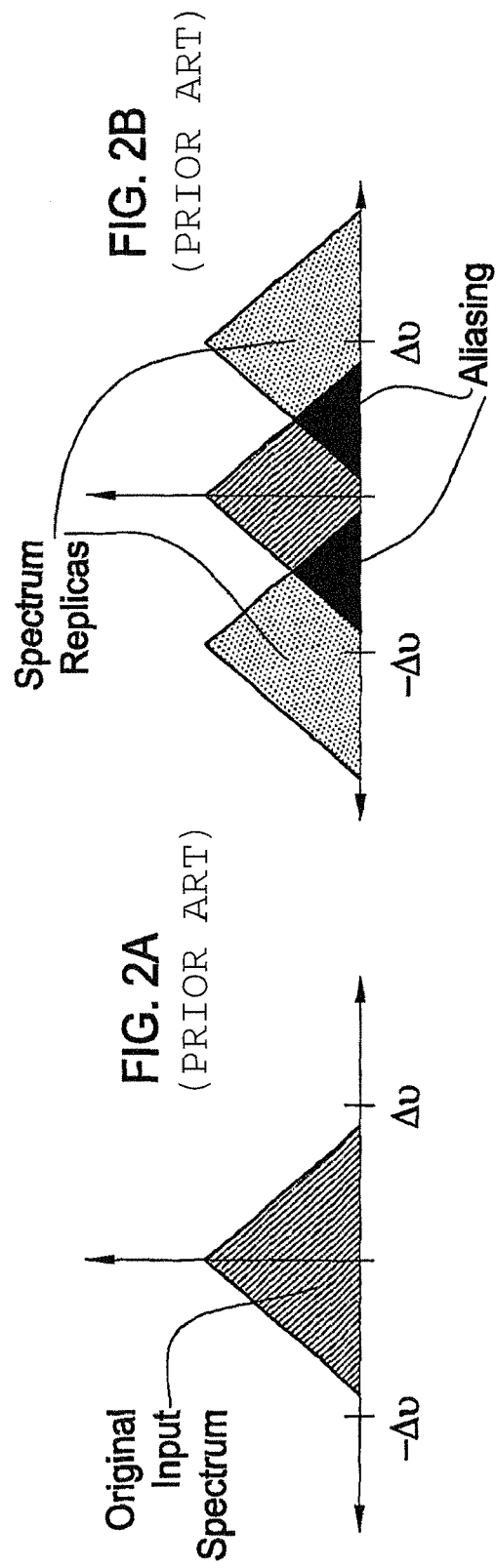

FIG. 5
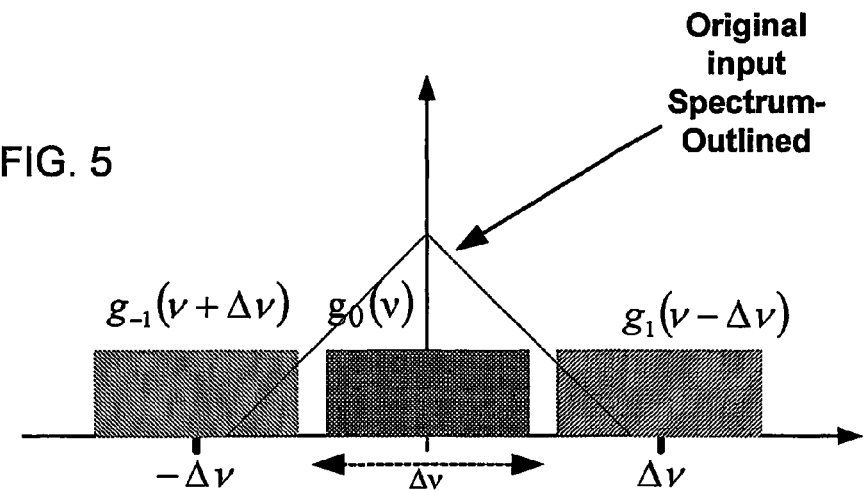
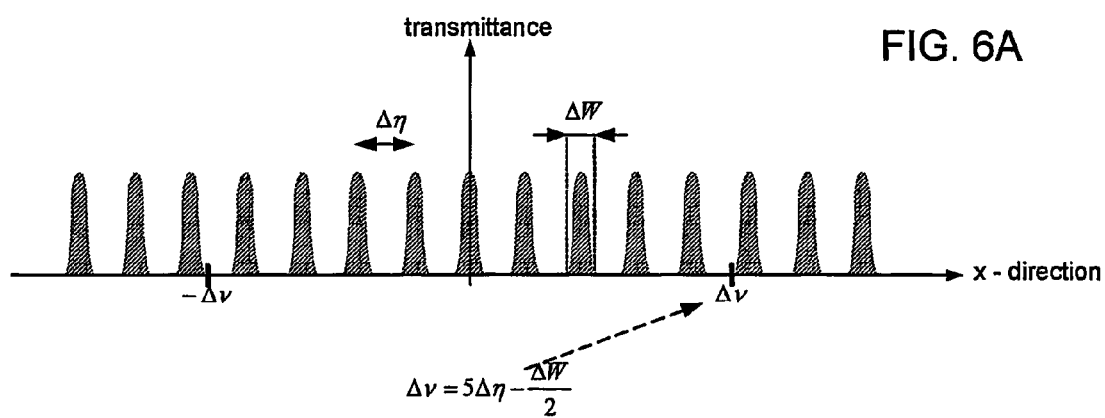
FIG. 6A
$$\Delta v = 5\Delta\eta - \frac{\Delta W}{2}$$
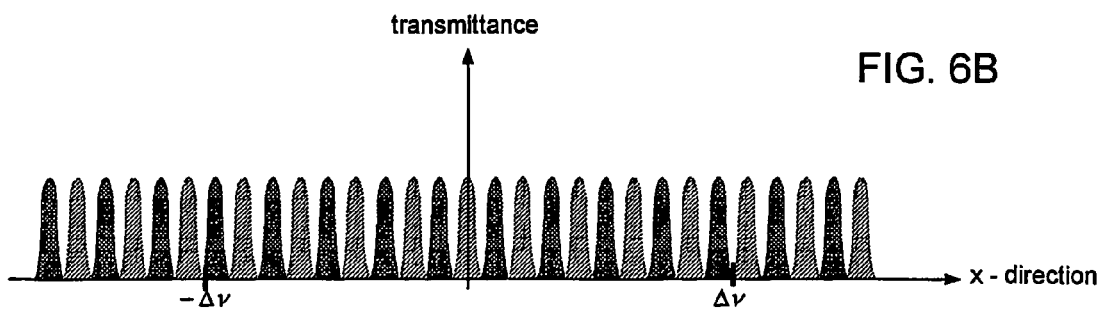
FIG. 6B

OPTICAL METHOD AND SYSTEM FOR ENHANCING IMAGE RESOLUTION

FIELD OF THE INVENTION

This invention relates to an optical method and system for enhancing image resolution.

BACKGROUND OF THE INVENTION

The resolution of an optical system is typically limited by diffraction effects. Techniques aimed at achieving the super resolution deal with extending the resolution limit set by diffraction caused by the physical dimensions of the optics. Digital imaging provides for exceeding the limit set by a non-zero pixel size of a photodetector (e.g., CCD), i.e., the geometrical resolution.

Common geometrical super-resolution methods rely on the sub-pixel displacement of an image impinging on the detector, using mirrors. In these methods, it is assumed that the input does not change during the period of the scan. The scan itself is coined micro-scan. Afterwards, different sampled inputs are computationally combined and an enhanced picture is produced. These methods, however, suffer from several drawbacks, such as the need for mechanical elements that make the system more complex, costly and prone to malfunctions; and non trivial retrieval of the output, as it involves deconvolution of the output. Examples for such implementations are disclosed in the following publication: R. Riesenberg, Th. Seifert, A. Berka, U. Dillner, "*Opto-micromechanical Super Resolution Detector System*", Proc. SPIE 3737, pp. 367-383, 1999.

Obviously, the above methods sacrifice a certain degree of freedom of the optical system. As indicated above, while the micro-scan is conducted, the input is assumed not to change. Therefore, the system temporal resolution has decreased in favor of enhanced spatial resolution. These super resolution methods sacrifice one or more of the systems' degrees of freedom in order to improve other degrees of freedom (such as spatial resolution). This is described in the following publication: Z. Zalevsky, D. Mendelovic, A. W. Lohmann, "*Understanding superresolution in Wigner space*", J. Opt. Soc. Am., Vol. 17, No. 12, pp. 2422-2430, 2000.

Such known effect as aliasing is typically considered as a problem in the imaging techniques. This effect is associated with the following: Any attempt to capture image detail with a spatial frequency slightly greater than the Nyquist frequency (i.e., that of the photodetector pixel array) results in a spatial or dimensional distortion of that detail, i.e. individual image points are stretched, shrunk, or displaced to fit the pixel array, and if such fine detail covers any appreciable area, then visible aliasing occurs. Practically, aliasing occurs when the image resolution is more than half of that of the detector (Nyquist sampling rate). In mathematical terms, aliasing occurs when the following condition takes place: $2\Delta v_{image} > \Delta v$, wherein $1/\Delta v_{image}$ is the image resolution measured on the detector plane, and $1/\Delta v$ is the detector resolution, $\Delta v = 1/\Delta x$, $\Delta x$ being the pixel pitch of the detector. As indicated above, aliasing effect is considered as a problem in imaging techniques, and various techniques are typically applied to reduce this effect.

SUMMARY OF THE INVENTION

There is a need in the art to facilitate the resolution enhancement (exceeding the geometrical resolution) by providing a novel imaging method and system that does not need any displacement of the element(s) of the imaging system.

The present invention solves the above problem by using the aliasing effect, rather than trying to suppress it. More specifically, the present invention utilizes a predetermined aperture coding of the wavefront of a light signal, indicative of at least a part of the object to be imaged with the enhanced resolution, while propagating towards a detector pixel array, such as to allow for using this aperture code to decode a sampled output of the detector pixel array resulting from the aliasing occurring in the detector plane, to thereby reconstruct the image with the enhanced resolution.

Here, the term "enhanced resolution" signifies resolution higher than that defined by the pixel size of the detector (geometrical resolution).

The present invention provides the enhancing of resolution of an image of at least a part of the object by a required factor k, due to utilizing an appropriate aperture coding. The latter consists of optical processing of the light signal with a function (code) predetermined in accordance with aliasing occurring in the detector plane, and so as to provide orthogonality of spectral data indicative of a sampled output of the detector. It should be understood that the maximal value of resolution enhancement k (zooming factor) is defined by a pixel pitch $\Delta x$ of the detector, wavelength $\lambda$, and F-number, $F_{\#}$, of the imaging system, namely $$k = \frac{\Delta x}{\lambda \cdot F_{\#}}.$$

The aperture coding function is a function of such parameters as: the factor, k, of the required resolution enhancement, the parameters of the detector pixel array (number N of pixels in the detector and pixel pitch $\Delta x$), and the imaging parameter, which is typically determined as a distance V between an imaging lens and the detector plane, which is, for coherent light, also the distance between the detector and the spectral plane where the coding is applied. Preferably, the aperture code is also a function of wavelength.

The coding is preferably applied to the wavefront of the light signal while substantially at the spectral plane of the imaging system, which is defined by the location of an imaging lens arrangement of the system. This is implemented by providing an optical mask in the vicinity of the spectral plane, namely by locating the optical mask upstream or downstream of the lens arrangement close thereto, or incorporating such a mask within the lens arrangement (e.g., providing an optical mask pattern on the surface of the lens or thereinside). It should be noted that, generally, the optical mask may be located at any known distance from the imaging lens, provided the mask configuration takes into account this distance.

The aperture coding is "orthogonal coding", namely such a coding that provides for the orthogonality of the spectrum of data indicative of the sampled output of the detector. This can be implemented by using either an orthogonal optical mask or an optical mask configured such as to provide orthogonality of the normalization of the sampled output of the detector in the Fourier domain. Considering the aperture coding applied in the spectral plane, the aperture coding consists of multiplying the wavefront of the light signal coming from the object (i.e., the Fourier transform of the object) by the mask function (pattern), which provides for orthogonality of the spectrum of the data representative of the sampled output of the detector. By processing the sampled output of the detector (or the normalization thereof) with the aperture code, the correct (with no aliasing) image of at least a part of the object is obtained with the image resolution enhanced by the predetermined factor.

The optical mask may be an amplitude coding mask or a phase only coding mask. The optical mask is either in the form of a fixed pattern (the so-called "passive mask") or variable pattern ("active mask") of spaced-apart regions with different optical properties, wherein the selected pattern (its period) is determined as the function of the above parameters. The optical mask may thus be in the form of a pattern of spaced-apart light transmitting and blocking regions, a phase grating (such as Dammann grating), or a Spatial Light Modulator (SLM) operable to selectively define a desired pattern of spaced-apart regions of different optical properties. Considering polarized input to the SLM, the SLM may perform the amplitude or phase coding, depending on whether it is equipped with an output polarizer or not, respectively.

The present invention may provide enhancing of the image resolution of a predetermined part of the object, while imaging the other parts of the object with the geometrical resolution of the system. This is achieved by additional processing of the sample output of the detector, and can be achieved out of a single captured image without involving any additional moving mechanical parts or temporal changes with time.

It should be understood that in the case that the entire obtained image should be of resolution enhanced by a certain factor k, the filed of view of the detector is such that the original object occupies approximately 1/k of the field of view of the detector. In the case, a part of the object is to be imaged with the enhanced resolution, while the rest of the object is to be imaged with the geometrical resolution, the number N of pixels in the detector field of view should be N=Mk+1 (for the specific wavelength for which the aperture coding mask is designed), wherein M is an integer such that this condition provides N as close as possible to the number of pixels in the detector.

Thus, according to one broad aspect of the invention, there is provided a method for imaging an object with image resolution for at least a part of the object exceeding, by a predetermined factor, a geometrical resolution defined by a detector pixel array, the method comprising motionless optical processing of the wavefront of a light signal indicative of at least a part of the object to be imaged with the enhanced resolution, while propagating towards the detector pixel array, said processing applying a predetermined function of said factor of resolution enhancement to said wavefront.

According to another aspect of the invention, there is provided a method for imaging an object with image resolution for at least a part of the object exceeding, by a predetermined factor, a geometrical resolution defined by a detector pixel array, the method comprising motionless optical processing of the wavefront of a light signal indicative of at least a part of the object to be imaged with the enhanced resolution, while propagating towards the detector pixel array, said optical processing utilizing said factor of resolution enhancement and aliasing effect occurring in the detector plane.

According to yet another aspect of the invention, there is provided a method for imaging an object with image resolution for at least a part of the object exceeding by a predetermined factor a geometrical resolution defined by a detector pixel array, the method comprising: applying an optical processing to the wavefront of a light signal indicative of at least a part of the object to be imaged with the enhanced resolution, while propagating towards the detector pixel array, said optical processing being predetermined in accordance with aliasing occurring in the detector plane and to provide orthogonality of spectral data indicative of a sampled output of the detector, to thereby enable digital processing of the sampled output corresponding to a single captured image of the object to reconstruct the image of said at least part of the object with the resolution enhanced by said factor.

According to yet another broad aspect of the invention, there is provided a method for imaging an object with image resolution for at least a part of the object exceeding by a predetermined factor a geometrical resolution defined by a detector pixel array, the method comprising applying a predetermined aperture coding to the wavefront of a light signal indicative of at least a part of the object to be imaged with the enhanced resolution, while propagating towards the detector pixel array, the aperture coding being predetermined in accordance with aliasing occurring in the detector plane and such as to provide orthogonality of spectral data indicative of a sampled output of the detector, to thereby enable using the aperture code to reconstruct the image of said at least part of the object with the resolution enhanced by said factor.

According to yet another broad aspect of the invention, there is provided a method for imaging an object with image resolution for at least a part of the object exceeding by a predetermined factor a geometrical resolution which is defined by a detector pixel array, the method comprising applying a predetermined aperture coding to the wavefront of a light signal indicative of at least a part of the object to be imaged with the enhanced resolution, while propagating towards a detector pixel array, the aperture coding producing a spatial spread spectrum of said wavefront on the detector plane such as to allow for using the aperture code for decoding a sampled output of the detector resulting from aliasing occurring in the detector plane, to thereby reconstruct the image of said at least part of the object with the resolution enhanced by said factor.

According to yet another broad aspect of the invention, there is provided a method for imaging an object with image resolution for at least a part of the object exceeding, by a predetermined factor k, a geometrical resolution which is defined by parameters of a detector pixel array, the method comprising applying a predetermined aperture code to the wavefront of a light signal indicative of at least a part of the object to be imaged with the enhanced resolution, while propagating towards the detector pixel array, said predetermined aperture code being applied to the wavefront of the light signal substantially at a spectral plane of the imaging system and being a function of said factor k of resolution enhancement, a number N of pixels in a filed of view of the detector, a pixel pitch $\Delta x$ of the detector, and a distance V between an imaging lens and the detector plane, said coding thereby allowing for decoding a sampled output of the detector resulting from aliasing occurring in the detector plane, to reconstruct the image of said at least part of the object with the resolution enhanced by said factor.

According to yet another broad aspect of the invention, there is provided a method for imaging an object with image resolution for at least a part of the object exceeding, by a predetermined factor, a geometrical resolution which is defined by parameters of a detector pixel array, the method comprising applying a predetermined aperture coding to the wavefront of a light signal indicative of at least a part of the object to be imaged with the enhanced resolution, while propagating towards the detector pixel array, said predetermined aperture coding being applied to the wavefront of the light signal substantially at a spectral plane of the imaging system and being a function providing for orthogonality of data representative of a sampled output of the detector and allowing for decoding the sampled output of the detector resulting from aliasing occurring in the detector plane, to thereby enable reconstructing the image of said at least part of the object with the resolution enhanced by said factor.

According to yet another aspect of the invention, there is provided a method for imaging an object with image resolution for at least a part of the object exceeding, by a predetermined factor k, a geometrical resolution which is defined by parameters of a detector pixel array, the method comprising:

applying an optical processing to the wavefront of a light signal, indicative of at least a part of the object that is to be imaged with the enhanced resolution, while propagating towards the detector pixel array, said optical processing being applied to the light signal substantially in a spectral plane of an imaging system defined by a location of an imaging lens arrangement, said optical processing including multiplying said wavefront by a predetermined function of said factor k of resolution enhancement, a number N of pixels in a field of view of the detector, a pixel pitch $\Delta x$ of the detector, and a distance V between the imaging lens arrangement and the detector plane;

decoding data indicative of a sampled output of the detector signal by multiplying an inverse Fourier transform of the sampled output by said predetermined code function, thereby reconstructing the image of said at least part of the object with the resolution enhanced by said factor.

The present invention also provides for generating a wavelength insensitive diffractive optical element. This is implemented by locating an appropriately designed wavelength mask in the optical path of light propagating in the imaging system. The wavelength mask may be a part of detector, or a part of imaging arrangement (e.g., a part of the aperture coding utility considering the use of this diffractive element in the optical zooming system of the above-described aspect of the invention). The wavelength mask is a pattern formed by an array of H wavelength blocking slots, each having a certain spectral width, $\delta\lambda$, and having predetermined spectral positions, $\lambda_1, \lambda_2, \ldots \lambda_H$, respectively. These pattern parameters are selected such as to satisfy a condition that an absolute value of Fourier transform of the wavelength mask function is bounded away from zero as much as possible, and to, on the other hand, transmit therethrough as much as possible light energy.

Thus, according to yet another broad aspect of the invention, there is provided a method for use in imaging objects, the method comprising passing a light signal through a wavelength mask having a pattern of regions of different transmission for different wavelengths, said pattern being such as to provide maximal energy and maximal contrast in the mask output; detecting the mask output with a pixel array detector; and processing data indicative of a sampled output of the detector, thereby generating a wavelength insensitive diffractive optical element.

According to yet another aspect of the invention, there is provided an optical mask for use in an imaging system to provide a super-resolution of imaging, the mask having a pattern of regions with different optical properties, said pattern being configured to apply to a light signal passing therethrough a predetermined function of a predetermined factor of resolution enhancement and parameters of a detector pixel array used for imaging, thereby allowing for using the mask function for processing a sampled output of the detector to obtain an image with resolution enhanced by said factor.

According to yet another aspect of the invention, there is provided an aperture coding utility for use in an imaging system to provide a super-resolution of imaging, the aperture coding utility being operable to define a predetermined pattern of regions with different optical properties, said pattern being configured to apply to a light signal passing therethrough a coding function of a predetermined factor of resolution enhancement and parameters of the detector, thereby allowing for using said function to decode sampled output of the detector to reconstruct an image with the resolution enhanced by said factor.

According to yet another aspect of the invention, there is provided a system for imaging an object with a detector pixel array, the system being configured for providing image resolution for at least a part of the object exceeding by a predetermined factor a geometrical resolution defined by the detector pixel array, the imaging system comprising an imaging lens assembly and an aperture coding utility configured to create a real and non-negative image of the object in the detector plane, the aperture coding utility being located at a predetermined location with respect to the imaging lens assembly and being configured to define a predetermined pattern of spaced-apart regions with different optical properties, said pattern being configured in accordance with the factor of resolution enhancement and aliasing occurring in the detector plane and to provide orthogonality of spectral data indicative of a sampled output of the detector, to thereby enable using the aperture code to decode the sampled output to reconstruct the image of said at least part of the object with the resolution enhanced by said factor.

According to yet another aspect of the invention, there is provided an imaging system comprising:

a detector pixel array defining a geometrical resolution of the imaging system and defining a certain number N of pixels in the detector field of view;

an imaging arrangement configured to create a real and non-negative image of the object in the detector plane, the imaging arrangement comprising a lens arrangement and an aperture coding utility located substantially in a spectral plane defined by a location of the lens arrangement, said aperture coding utility being an optical mask configured to define a pattern of spaced-apart regions with different optical properties, said pattern being a function of a predetermined factor k, the number N of pixels in the detector field of view and pixel pitch $\Delta x$, and a distance V between the imaging lens arrangement and the detector plane, such as to provide orthogonality of spectral data indicative of the sampled output of the detector, the aperture coding utility optically processing a wavefront of a light signal passing therethrough to produce a predetermined spatial spread spectrum of said wavefront on the detector plane such as to allow decoding the sampled output of the detector resulting from aliasing occurring in the detector plane;

a processor unit connectable to the detector, the processor unit being configured to apply said predetermined aperture code to data indicative of the sampled output of the detector thereby reconstructing the image of at least part of the object with the resolution enhanced by said factor.

The present invention, in its yet another aspect, provides a diffractive optical arrangement for use in imaging systems, the diffractive optical arrangement comprising a wavelength mask accommodated in an optical path of light coming from an object to be imaged to a pixel array detector, the wavelength mask having a pattern, said pattern being formed by an array of H wavelength blocking slots, each having a certain spectral width, $\delta\lambda$, and having predetermined spectral positions, $\lambda_1, \lambda_2, \ldots \lambda_H$, respectively, said parameters of the pattern being selected to provide maximal energy and maximal contrast in the mask output, the diffractive optical element being thereby wavelength insensitive.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 1 is a schematic illustration of an imaging system of the present invention;

FIGS. 2A and 2B illustrate the general principles of the aliasing effect;

FIG. 3A shows the original input signal, FIG. 3B illustrates the physical characteristics of the pixels in the detector, FIG. 3C shows the input sampled by the detector, and FIG. 3D shows the Fourier transform of the detector output for the "ideal" detector;

FIG. 5 exemplifies an aperture coding mask suitable to be used in the present invention for enhancing the image resolution by a factor of 3;

FIGS. 6A and 6B exemplify the principles of the present invention for the case of coherent illumination, wherein FIG. 6A shows an example of the aperture coding mask function, and FIG. 6B shows the effect of sampling the coded signal by the detector pixel array;

FIGS. 7A to 7D illustrate the simulation results for a specific example of the detector parameters, wherein FIG. 7A shows an input image of a cosine grating;

FIG. 7B shows the aperture coding mask used in the simulation;

FIG. 7C shows the simulation results in the form of the ideal output of the system; the detector sampled output without applying the method of the invention, the input after reconstruction using the aperture coding of the invention; and FIG. 7D illustrates the Fourier plane of the system in the form of the original input spectrum; the spectrum of the sampled output obtained while using the aperture coding mask; and a signal retrieved using the aperture coding super resolution of the invention;

FIGS. 8A to 8C illustrate the experimental results obtained with a simple imaging system utilizing specific parameters of the detector, wherein FIG. 8A shows the sampled output of the input signal processed by the aperture coding mask;

FIG. 8B illustrates the input sampled by the detector with no aperture coding mask;

FIG. 8C shows a desired (ideal) output of the system, the sampled output of the input without the aperture coding, and the retrieved output using the aperture coding super resolution;

FIGS. 10A-10E show experimental results obtained when using the present invention in the system operating with polychromatic illumination, wherein:

FIG. 10A presents an original input image;

FIG. 10B shows the image blurring due to the polychromatic illumination;

FIGS. 10C and 10D show the results of inverse filtering with a threshold of 1% and 10%, respectively; and no spectral mask FIG. 10E shows the results obtained when using a spectral mask;

DETAILED DESCRIPTION OF THE INVENTION

Figure 3A:
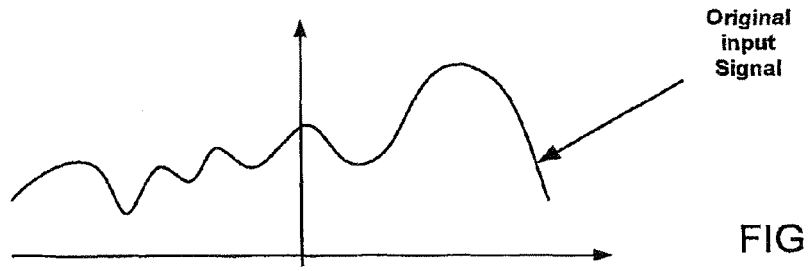
FIGS. 3A to 3D illustrate the principles of sampling a signal by a detector pixel array.

Referring to FIG. 1, there is schematically illustrated an imaging system 10 according to the invention for imaging an object, which is referred to as input light 12. The system 10 includes an imaging assembly 14 and a pixel array detector (e.g., CCD) 16. Connectable to the detector is a processor unit 18. The detector (its pixel size) defines a geometrical resolution of the system. The system 10 is configured to provide an image of at least a part of the object with resolution higher than the geometrical resolution by a predetermined factor k.

The imaging assembly 14 is configured to create a real and non-negative image of the object in the detector plane. The imaging assembly 14 includes a lens arrangement 14A defining a spectral plane of the system; and an aperture coding utility 14B, which in the present example is located substantially in the spectral plane. The lens arrangement defines a lens aperture D. In the present example, the lens arrangement is formed by a single imaging lens 14A.

The aperture coding utility 14B is an optical mask. Although in the present example, the mask 14B is shown as being located upstream of the lens close thereto, it should be understood that the mask may be located either upstream or downstream of the lens arrangement (in the closest vicinity of the lens or spaced therefrom a certain known distance), or may be integral with the lens arrangement, i.e., carried on a surface of the lens or incorporated thereinside.

The optical mask 14B operates to enhance the resolution of the image of at least part of the object by the predetermined factor k. The aperture coding mask 14B is selected to be non-negative, namely, such that the Fourier transform of the coding function is real and non-negative. The mask 14B is configured so as to enable the image reconstruction. To this end, the optical mask 14B is configured to take into account aliasing effect unavoidably occurring at the detector plane, and is such as to provide orthogonality of spectral data indicative of the sampled output of the detector.

The optical mask 14B defines a pattern of spaced-apart regions with different optical properties. Preferably, this pattern is a function of the following parameters: the predetermined factor k of the resolution enhancement; the parameters of the detector, namely, a number N of pixels in a field of view of the detector and the pixel pitch $\Delta x$; a distance V between the imaging lens arrangement 14A and the detector plane; and preferably also the wavelength $\lambda$.

With regard to the number N of pixels in the field of view of the detector, it should be understood that it is limited by the factor k, which is identical to the expected resolution improvement. For example, considering that the entire obtained image is to be of resolution enhanced by factor k, the number of N should be such that the original input (object or part thereof that is to be imaged) occupies approximately 1/k pixels of the field of view of the detector. As will be described more specifically further below, in the case a part of the object is to be imaged with the enhanced resolution and the rest of the object—with the geometrical resolution of the detector, the number N of pixels in the detector field of view should satisfy a condition N=Mk+1, wherein M is an integer such that this condition provides N as close as possible to the number of pixels in the detector. This condition is expressed for a specific wavelength for which the mask is designed. The case of mask design for operation with various wavelengths is described below with reference to equations (44A) and (44B).

The coding function will be generally denoted $CDM\tilde{A}(v)$ wherein the coordinate v and the index refer to signals in the Fourier plane (the aperture plane). The coding function is such that applying this function to the wavefront of a light signal (passing this light signal through the mask 14B) produces the spatially spread distribution of the input light on the detector plane (similar to the spread spectrum approach in CDMA) in accordance with aliasing effect occurring on the detector plane, and such as to provide orthogonality of spectral data indicative of the detector output. The spatial spread spectrum distribution may for example be implemented by producing a desired number of replications of the input light signal, as will be described more specifically further below. This allows for using the aperture code for digital processing of the sampled output of the detector resulting from aliasing occurring in the detector plane, to thereby reconstruct the image of at least part of the object with the resolution enhanced by the factor k. The orthogonality of data indicative of the output of the detector may be directly obtained at the sampled output of the detector (in the case of a regular orthogonal amplitude coding mask), or obtained by normalizing the sampled output (in the case of a phase only mask).

In the present example of FIG. 1, the aperture coding utility includes a single optical mask 14B. It should, however, be noted that the same may be implemented using several masks. As will be described further below with reference to FIG. 9, for operating with polychromatic illumination, the aperture coding utility preferably also includes a spectral mask.

The optical mask 14B may be an amplitude-coding mask. This may a predetermined fixed pattern of spaced-apart light transmitting and blocking regions, or may be an SLM configured for polarized input and output thereof. Alternatively, the optical mask may be a phase-coding mask. This may a phase grating (e.g., Dammann grating), or SLM with no output polarizer.

The use of the aperture coding of the present invention eliminates the need for additional mechanical elements, such as those used for microscan or those used in performing optical zooming. In the imaging system of the invention, neither the detector nor additional elements are moved. The imaging system of the present invention is suitable for operating with coherent or incoherent illumination, as will be described more specifically further below.

The following is the theoretical explanation of the principles underlying the present invention:

Considering a conventional imaging system (formed by imaging lens and detector), wherein the lens has a focal length F and aperture D and is located at a distance R from the detector plane (R>>F), the viewed resolution in the image plane is limited by diffraction, and equals to $1.22\lambda F\#$, where $\lambda$ is the wavelength and F# is the F-number of the imaging system and is determined as:

$$F_\# = \frac{F}{D} \quad (1)$$

Translating the resolution bound to the object plane, the smallest detail possibly viewed is of the size:

$$(\delta x)_{diff} = 1.22\frac{\lambda}{D}R \quad (2)$$

The detector has a non-zero number of pixels having a size of $\Delta d$. The pixel size provides the "geometrical resolution" bound. This limitation expressed in the object plane yields:

$$(\delta x)_g = \frac{\Delta d}{F}R \quad (3)$$

In most cases, $$\Delta d > 1.22\frac{\lambda F}{D},$$

and the geometrical resolution is the bottleneck, in the optical system. For example, for the common imaging system (with no aperture coding) with the following parameters: $F_\#=2$, F=300 mm, $\lambda=0.5$ μm and R=10 km, the smallest detail possibly viewed is of the size $(\delta x)_{diff}=0.04$ m. For $\Delta d=10$ μm, the geometrical resolution in the object plane is $(\delta x)_g=0.33$ m. Thus, it is the geometrical resolution that limits the overall system resolution.

When an "image" arrives to the detector plane, the detector samples the image with finite pixels having a defined pitch. Sampling the image creates replicas of the originals image spectrum in the frequency domain. These replicas are spaced at a constant offset $\Delta v$ in the spectrum, which is proportional to one over the resolution, $\Delta x$, of the detector (e.g., CCD): $\Delta v=1/\Delta x$, wherein $\Delta x$ is the pixel pitch, i.e. its spatial resolution. If the distance between the replicas is not sufficient, the replicas overlap. As a result the image is corrupted.

FIGS. 2A and 2B show, respectively, an original input spectrum (before sampled by the CCD), and the sampled corrupted spectrum (sampled output of the CCD) which is a result of aliasing that occurs when the image resolution is more than half of that of the CCD (Nyquist sampling rate). As indicated above, in mathematical terms, aliasing occurs when $2\Delta v_{image}>\Delta v$, wherein $\Delta v_{image}$ is the image resolution measured on the CCD plane. Diffraction effects are neglected as it is assumed that geometrical resolution bound is dominant.

Therefore, sampling the physical image by the CCD is equivalent to multiplying the input by a grating with a frequency of the pixels spacing and then convolving the result with a rect function (a rectangular window) with a width of the size of a single CCD pixel. The latter simulates the effect of the non-zero pixel size. In the frequency plane, this is equivalent to convolving the original input spectrum with a train of pulses (due to the pixel spacing), and then multiplying the result by a sinc function $$\left(\text{sinc}(x) = \frac{\sin(\pi x)}{\pi x}\right)$$

with a width of $2/\Delta d$.

Figure 3B:
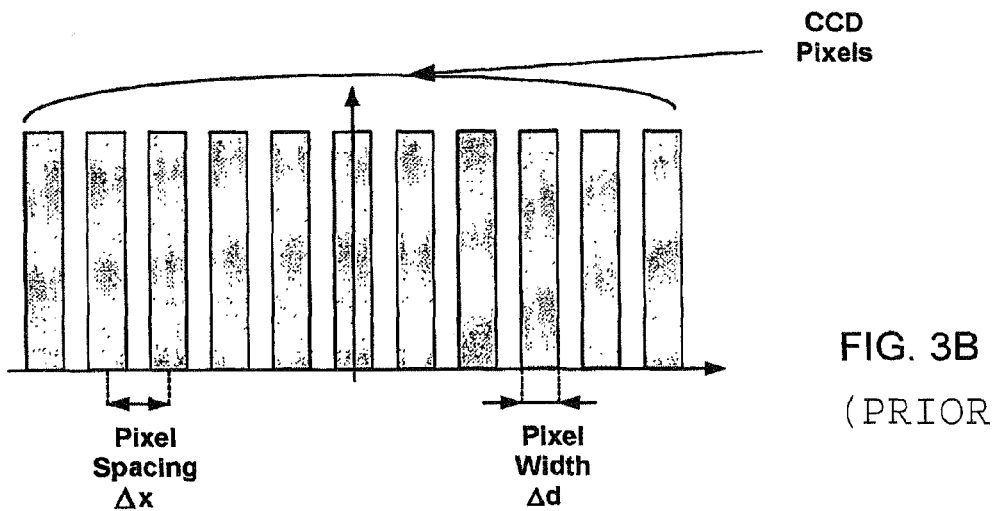
Figure 3C:
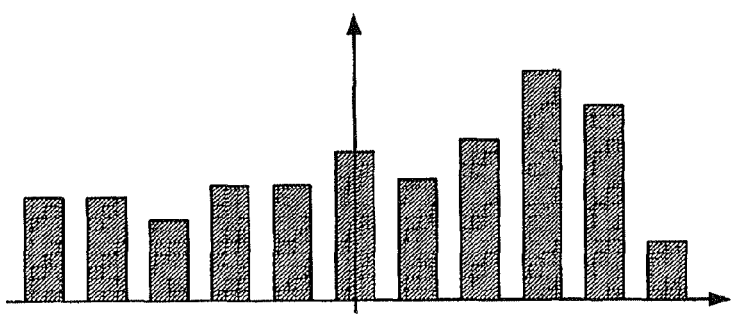
Figure 3D:
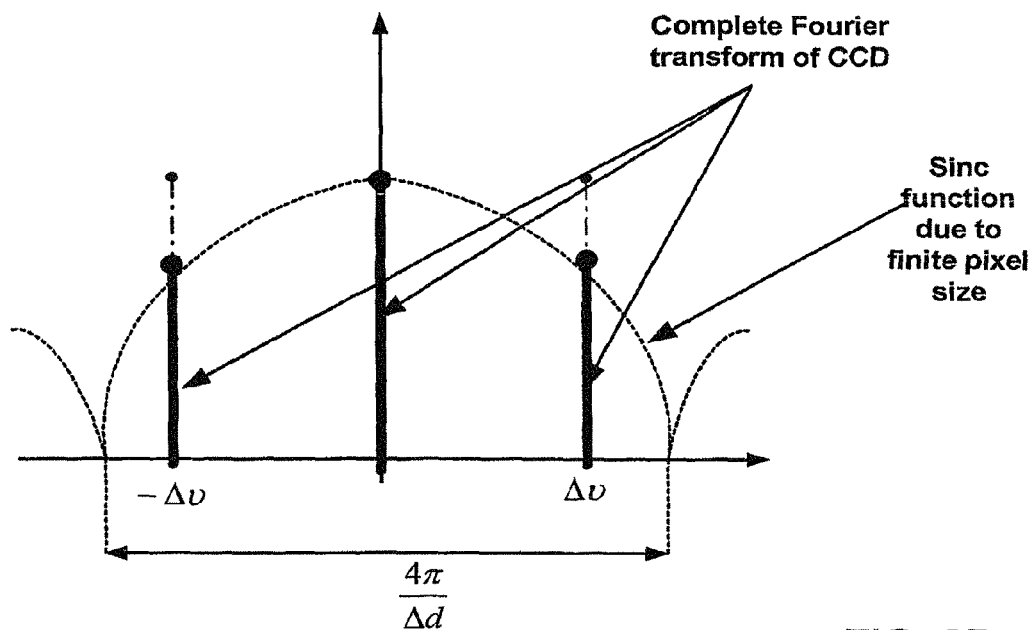

The above is illustrated in FIGS. 3A to 3D. FIG. 3A shows the original input signal (spatial distribution of the input light intensity). FIG. 3B illustrates the physical characteristics of the pixels in the CCD. FIG. 3C shows the sampled input. FIG. 3D shows the Fourier transform of the CCD output (of the sampled input), for the so-called "ideal" CCD represented by a train of pulses spaced $\Delta x$ apart each $\Delta d$ wide.

The pixel spacing produces a train of delta-functions in the Fourier transform, and the pixel width creates a sinc function. Multiplying these functions generates the complete Fourier transform of the CCD output. Thus, the position of the delta function with respect of the sinc function corresponds to the duty cycle of the pixel field factor.

The technique of the present invention utilizes this aliasing effect to reproduce highly resolved image, instead of conducting a micro-scan to suppress the aliasing effect. This is achieved by coding the spectrum of the original input signal in such a way as to overcome data corruption. This coding is performed prior to sampling to allow resolution enhancement.

Thus, aliasing resulting from sampling the image by the CCD, distorts the image. This is due to the fact that the spectral bandwidth of the physical image is relatively large. Data corruption occurs because the different parts of the spectrum in overlapping regions cannot be discriminated. To avoid data loss in the regions of the spectrum that will overlap because of aliasing, these potentially overlapping regions of the spectrum are coded with different pattern features (spectral mask regions) of the optical mask (14B in FIG. 1). These mask regions are such as to provide orthogonality of data indicative of the sampled output. As indicated above, this may be achieved by using the orthogonal optical mask, or using a phase mask and normalization of the CCD output (as will be described more specifically further below). The coding is carried out in the Fourier plane, because replicas (due to sampling) are created in the Fourier plane. The correct coding of the different parts of the spectrum provides for preventing the data corruption and for enhancing the received image.

Turning back to FIG. 1, is should be noted that since the lens aperture 14A is not the cause for the resolution reduction, the aperture coding mask 14B can be attached to the lens 14A, and performs the required orthogonal coding of the various spectral regions, which are aliased later on due to the sampling at the CCD. It should be understood that the term "orthogonal coding" signifies such a coding that provides for the orthogonality of spectral data indicative of the sampled output of the CCD, namely, coding either by an orthogonal optical mask or coding by such a mask that provides for orthogonality of the normalization of the sampled output.

Figure 4:
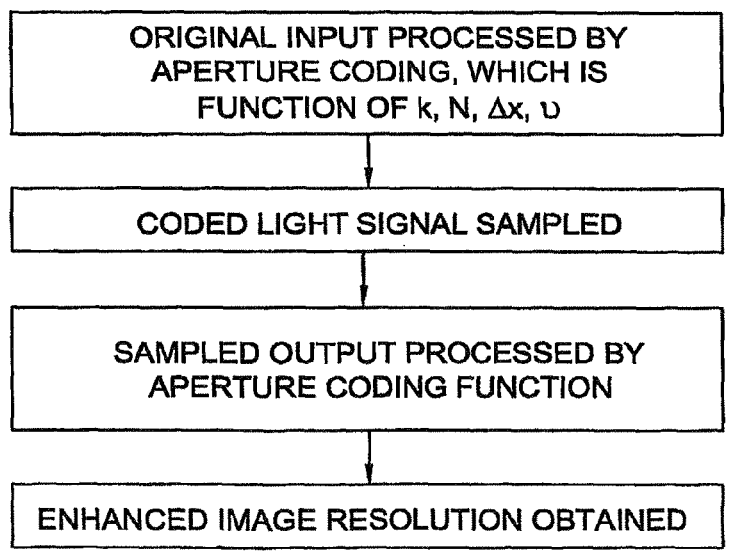
FIG. 4 shows the main operational steps of a method of the present invention for enhancing the image resolution.

The main operational steps of the system 10 will now be described with reference to FIG. 4. The wavefront of a light signal (Fourier transform of the object), while passing through the aperture coding utility 14B (optical mask), is optically processed by the aperture coding utility 14B. Considering the aperture coding while in the spectral plane, this processing consists of multiplying this wavefront by the mask function (predetermined code). As indicated above, this is a function of the resolution enhancement factor k, the number N of pixels in the field of view and the pixel pitch $\Delta x$, a distance V between the lens 14A and the detector plane 16, and preferably also wavelength $\lambda$. The so-produced coded light signal is received at the detector, where the signal is sampled. The sampled output of the detector is electronically processed by the processor unit 18. The processing consists of multiplying an inverse Fourier transform of the sampled output by the aperture coding function. As a result, a non-corrupted image with the enhanced resolution is obtained.

The following is the theoretical analysis of the concept of the present invention for a simple situation, in which the resolution is to be enhanced by a factor of 3. Only a one-dimensional calculation is carried out in the present example. In this example, an ideal CCD is considered, in which the pixels are indefinitely small and are arranged with a pitch of $\Delta x$. The case of finite size pixels will be described further below.

Here, the coordinate of the signal in the Fourier plane (aperture plane) is denoted v and identified by index, and the coordinate of signals in the CCD plane is denoted x.

The CCD is assumed to be ideal, i.e. being able to sample the image field in discrete points. Therefore, the CCD is modeled as an infinite train of impulses:

$$CCD(x) = \Sum_{n=-\infty}^{28} \delta(x - n\Delta x) \tag{4}$$

wherein n is integer.

As shown graphically in FIG. 5, the aperture coding mask is divided into three sub-functions as follows:

$$M\tilde{A}SK(v) = \Sum_{n=-1}^{1} g_n(v - n\Delta v) \tag{5}$$

whereas $g_i$ have the following properties promising the orthogonality of the mask sub-functions:

$$\begin{cases} g_i(v)g_j(v - \Delta v) = 0 & i \neq j \\ g_i(v) = 0 & i = -1, 0, 1 \quad \forall v \notin \left\{-\frac{3\Delta v}{2}, \frac{3\Delta v}{2}\right\} \\ g_i(v) \geq 0 & \forall v \end{cases} \tag{6A}$$

or for the general case of factor k of resolution enhancement:

$$\begin{cases} g_i(v)g_j(v - \Delta v) = 0 & i \neq j \\ g_i(v) = 0 & i = -1, 0, 1 \quad \forall v \notin \left\{-\frac{k\Delta v}{2}, \frac{k\Delta v}{2}\right\} \\ g_i(v) \geq 0 & \forall v \end{cases} \tag{6B}$$

The aperture coding mask is selected to be non-negative, namely, such that the Fourier transform of the mask function is real and non-negative. The mask is composed of pixels of the size $\Delta\eta$. Each pixel is divided into chips, each having the size of $\Delta W$. The aperture coding mask function is multiplied, in the Fourier plane, with the spectrum of the input light, I, which represents field quantities. Therefore, the output in the Fourier plane is:

$$\tilde{O}(v) = \tilde{I}(v) M\tilde{A}SK(v) \tag{7}$$

The CCD samples this output, and the sampled output of the CCD, s(x), is:

$$S(x) = O(x) CCD(x) \tag{8}$$

Expressing equation (8) in the Fourier plane and using equations (4), (5) and (7) provides:

$$\tilde{S}(v) = \tilde{O}(v) * CC\tilde{D}(v) \tag{9}$$

$$= \left[\tilde{I}(v) \sum_{n=-1}^{1} g_n(v - n\Delta v)\right] * \left[\sum_{n=-\infty}^{\infty} \delta\left(v - n\frac{1}{\Delta x}\right)\right]$$

wherein sign * denotes the convolution operation.

Since $\Delta v = 1/\Delta x$, the last expression can be simplified to:

$$\tilde{S}(v) = \left[\tilde{I}(v) \sum_{n=-1}^{1} g_n(v - n\Delta v)\right] * \left[\sum_{n=-\infty}^{\infty} \delta(v - n\Delta v)\right] \tag{10}$$

$$= \sum_{n=-\infty}^{\infty} \tilde{I}(v - n\Delta v) \left[\sum_{m=-1}^{1} g_n(v - (n+m)\Delta v)\right]$$

wherein n and m are integers.

The retrieval of the enhanced image is achieved by Fourier transforming the grabbed output of the CCD and multiplying the result with the original aperture coding (the mask function):

$$\tilde{R}(v) = \tilde{S}(v)\tilde{MASK}(v) \quad (11)$$

$$= \left\{ \sum_{n=-\infty}^{\infty} \tilde{I}(v-n\Delta v)\left[\sum_{k=-1}^{1} g_n(v-(n+k)\Delta v)\right] \right\}\left[\sum_{m=-1}^{1} g_m(v-m\Delta v)\right]$$

$$= \sum_{n=-\infty}^{\infty} \tilde{I}(v-n\Delta v)g_n(v-n\Delta v)$$

$$= \tilde{I}(v)\tilde{MASK}(v)$$

Selecting only the output field quantities inside the non-zero chip of each pixel for the given aperture coding mask, generates a downsampled output which is the desired output, $\tilde{I}(v)$.

Hence, correctly modulating the input spectrum (by aperture coding) prevents data corruption caused by aliasing.

Considering physical imaging systems, the input of the optical system is assumed to be only real and non-negative. This input is convolved with the Fourier transform of the aperture coding mask, which is also real since it is originally symmetrical in the Fourier plane. The aperture coding mask is selected to have no negative values in the image plane. This will be more specifically described further below for different types of illumination.

The above theoretical analysis relates to the "ideal" CCD. In a real CCD, the pixels have finite dimensions. This affects the output spectrum, since it results with multiplying the spectrum with a sinc function, as mentioned above. This will have no effect on the spectrum orthogonality. It will only introduce a need for recalibrating the sampled spectrum, while not introducing any difficulties.

The CCD is assumed to perform ideal sampling, yet physically it measures only absolute values of the sampled signal. If the aperture coding mask is chosen correctly, then this limitation can be overcome, as will be described more specifically further below.

The following is the explanation of the technique of the present invention with regard to noise reduction. It should be understood that if the original image has some kind of noise embedded, then its reconstruction will have the same noise. The technique of the present invention provides an advantage on noise reduction accumulated after the image is coded, such as during sampling by the CCD. If the CCD is scratched or dirty, this presents a very narrow interference multiplied by the input function. The signal, S'(x), measured by the CCD is equal to:

$$S'(x)=S(x)P(x) \quad (12)$$

wherein P(x) is the interference function (noise function).

The retrieved output (in the Fourier domain), $\tilde{R}'(v)$, is determined as:

$$\tilde{R}'(v)=[\tilde{S}(v)*\tilde{P}(v)]\tilde{MASK}(v)=[\tilde{S}(v)\tilde{MASK}(v)]*[\tilde{P}(v)\tilde{MASK}(v)] \quad (13)$$

Taking into account equation (11), the retrieval output can be rephrased as:

$$\tilde{R}'(v)=[\tilde{I}(v)\tilde{MASK}(v)]*[\tilde{P}(v)\tilde{MASK}(v)] \quad (14)$$

In the space domain, this equals to:

$$R'(x)=[I(x)*MASK(x)]\Pi P(x)*MASK(x)] \quad (15)$$

Since the aperture coding function is assumed to be pseudo white noise in the object plane, and since the noise function, n, is very narrow, it can be assumed that:

$$P(x)*MASK(x) \approx const+\epsilon MASK(x-x_0) \quad (16)$$

whereas const >> $\epsilon$.

Using equation (14), the retrieved image is:

$$R'(v)=constI(v)MASK(v)+\epsilon exp(-2\pi i x_0)[I(v)MASK(v)]*MASK(v) \quad (17)$$

Since the noise factor is constant and relatively negligible, the retrieved image can be expressed:

$$R'(v) \approx const \tilde{I}(v)\tilde{MASK}(v) \quad (18)$$

The retrieval is now identical to that of non-interfered signal. It is thus evident that the aperture coding advantageously provides for overcoming very space limited interference.

The following are theoretical analysis of the technique of the present invention for different types of illumination.

Coherent Illumination

When coherent illumination is used, the coherent transfer function, $\tilde{CTF}(v)$, represents the resolution limitations due to diffraction and additional elements in the system. The $\tilde{CTF}(v)$ equals to the aperture D of the imaging lens multiplied by the aperture coding mask, $\tilde{MASK}(v)$, which is attached to, located close to, or made integral with the lens. The output image in the CCD plane, $O_i$, can be determined as:

$$O_i(x)=CTF(x)*g_g(x) \quad (19)$$

whereas $g_g$ indicates the object obtained at the CCD plane in an ideal system (without any other aberrations).

The CCD samples only magnitudes of the image. Therefore, the sampled image, $I_i$, is:

$$I_i=|CTF(x)*g_g(x)|^2 \quad (20)$$

To prevent the information loss, the system output, $O_i$, should be real and non-negative. This will enable retrieval of output directly from the sampled image $I_i$ (which is actually the squared absolute of $O_i$). In order to ensure direct retrieval of the object, $g_g$, in full resolution, both the aperture coding mask and the image must be real and non-negative. Assuming a real image having no negative values; only the aperture coding mask is to be dealt with. The aperture coding mask should have a Fourier transform that is real and non-negative. Furthermore, considering the orthogonal aperture coding mask, it should fulfill equation (6B) above. An example for a suitable aperture coding mask is presented below.

The aperture coding mask is selected as a mask composed of an infinite train of delta-functions in the space domain, each two locally adjacent impulses being spaced from each other a distance $\Delta\eta$. This signal has a positive spectrum. The spectrum is convolved with a Gaussian profile, with the width of a coding mask chip, $\Delta W$. The width of this chip corresponds to the overall dimensions of the detector (corresponds to the field of view of the CCD). The result of convolution is multiplied by a rect function setting the size of the mask to finite size, $\Delta BW$, due to the fact that the mask has finite dimensions. Thus, this parameter, $\Delta BW$, corresponds to the dimensions of the aperture of the imaging lens (D in FIG. 1). The spectrum of such a mask can be calculated as:

$$CT\tilde{F}(v) = \{\text{Infinite pulse train} * \text{Gaussian}\}\text{rect function} \quad (21)$$

$$\Downarrow$$

$$CT\tilde{F}(v) = \left\{\left[\sum_{n=-\infty}^{\infty} \delta(v - n\Delta\eta)\right] * \exp\left(-\frac{v^2}{2\Delta W}\right)\right\} \text{rect}\left(\frac{v}{\Delta BW}\right)$$

$$\Downarrow$$

$$CTF(x) = \Delta W \sqrt{2\pi} \left\{\left[\sum_{n=-\infty}^{\infty} \delta\left(x - n\frac{2\pi}{\Delta\eta}\right)\right] \exp\left(-\frac{x^2 \Delta W^2}{2}\right)\right\} * \text{sinc}\left(\frac{x\Delta BW}{2}\right)$$

Assuming that $\Delta BW \gg \Delta W$, a real and non-negative spectrum is received, as desired. It can easily be shown that this mask also satisfies the conditions for aperture coding, if the following equation is realized:

$$\Delta v = k\Delta\eta - \Delta W/2, \; k \in N \quad (21)$$

This is illustrated graphically in FIGS. 6A and 6B, wherein FIG. 6A shows an example of the aperture coding mask function, and FIG. 6B shows the effect of sampling the resulted coded signal by the CCD. The mask function is such as to provide for orthogonality of data representative of the sampled output, and thus data retrieval is possible. As shown, no overlapping occurs in the sampled output of the CCD.

Incoherent Illumination

Considering incoherent illumination, the intensity distribution sampled by the CCD is determined as:

$$\Im(I_i) = OT\tilde{F}(v)(\tilde{G}_g(v) \otimes \tilde{G}(v)) \quad (22)$$

wherein $OT\tilde{F}(v)$ is the incoherent optical transfer function, $\otimes$ symbolizes correlation operation. A more detailed derivation of these relations is described in the following publication: J. Goodman, "*Introduction to Fourier Optics*" McGraw-Hill, Singapore, International 2nd Edition, pp. 101-104, 1996.

The operation with incoherent illumination affects the output of the system. This requires the aperture coding mask to be such that the result of autocorrelation remains orthogonal.

The incoherent optical transfer function can be expressed as a product of autocorrelation of the coherent transfer function:

$$OT\tilde{F}(v) = (CT\tilde{F}(v) \otimes CT\tilde{F}(v)) \quad (23)$$

In the CCD plane, this can be expressed as:

$$OT\tilde{F}(x) = |CTF(x)|^2 \quad (24)$$

wherein $OT\tilde{F}(v)$ is the Fourier transform of the spatial OTF(x) and $CT\tilde{F}(v)$ is the Fourier transform of the spatial CTF(x). Due to its definition, the $OT\tilde{F}(v)$ satisfies several mathematical conditions:

$$\begin{cases} OT\tilde{F}(v=0) \geq 0 \\ OT\tilde{F}(v) = OT\tilde{F}(-v) \\ OT\tilde{F}(v=0) \geq |OT\tilde{F}(v)| \end{cases} \quad \begin{cases} OTF(x) \text{ is Real} \\ OTF(x) \geq 0 \\ OTF(x) = OTF(-x) \end{cases} \quad (25)$$

Furthermore, for the purposes of the present invention, the function $OT\tilde{F}(v)$ should satisfy the condition of equation (6B) above (to promise orthogonality), and should have a real and non-negative spectrum. The final mask $CT\tilde{F}(v)$ can be easily derived, since in view of the above theoretical analysis, OT $\tilde{F}(v)$ that satisfies all of the demands can be constructed. The mask that will be placed in the imaging system will be CT $\tilde{F}(v)$. Since it is real and non-negative, the derivation is direct from equation (24):

$$OTF(x) = [CTF(x)]^2 \quad (26)$$

$$\Downarrow$$

$$CTF(x) = \sqrt{OTF(x)}.$$

It should be noted that since the spectrum of the image is multiplied with a high-resolution aperture coding mask, the image is spatially spread in the image plane. Since this spread image should not overlap with other images, the field of view of the system must be limited (otherwise, the original input will be distorted). Therefore, the field of view must be limited by a factor, which is identical to the expected resolution improvement, e.g., if the resolution is to be enhanced by factor 3, the original image should not cover more than one third of the CCD. Possible energy loss might occur only due to the fact that aperture coding mask is placed over the imaging lens. In the more general case that is described further below, the object is not to be restricted to one third of the field of view, but the dynamic range is decreased to preserve the information capacity (i.e. energy lost will be caused). The above analysis was carried for one-dimensional case. Extension of this technique to two-dimensional images is direct. The aperture coding mask should provide for orthogonality in both axes. Such a mask placed on the lens (or incorporated thereinside) of the above-described optical setup will produce a resolution enhancement of $k_1$ on the first axis and $k_2$ on the second perpendicular axis (depending on mask attributes on each axis). This will cause a loss of the total field of view of $k_1 \cdot k_2$. Image retrieval will also be identical to that of one-dimensional case, since a two-dimensional Fourier Transform can be conducted separately for each axis.

Reference is made to FIGS. 7A to 7D illustrating the simulation results for the case of the following real dimensions of the CCD pixel size and pixel spacing (pitch).

| Attribute | Value | Units |
|---|---|---|
| Number of CCD pixels | 640 | — |
| Pixel spacing, $\Delta x$ | 9.6 | Mm |
| Pixel size, $\Delta d$ | 6.72 | Mm |

Figure 7A:
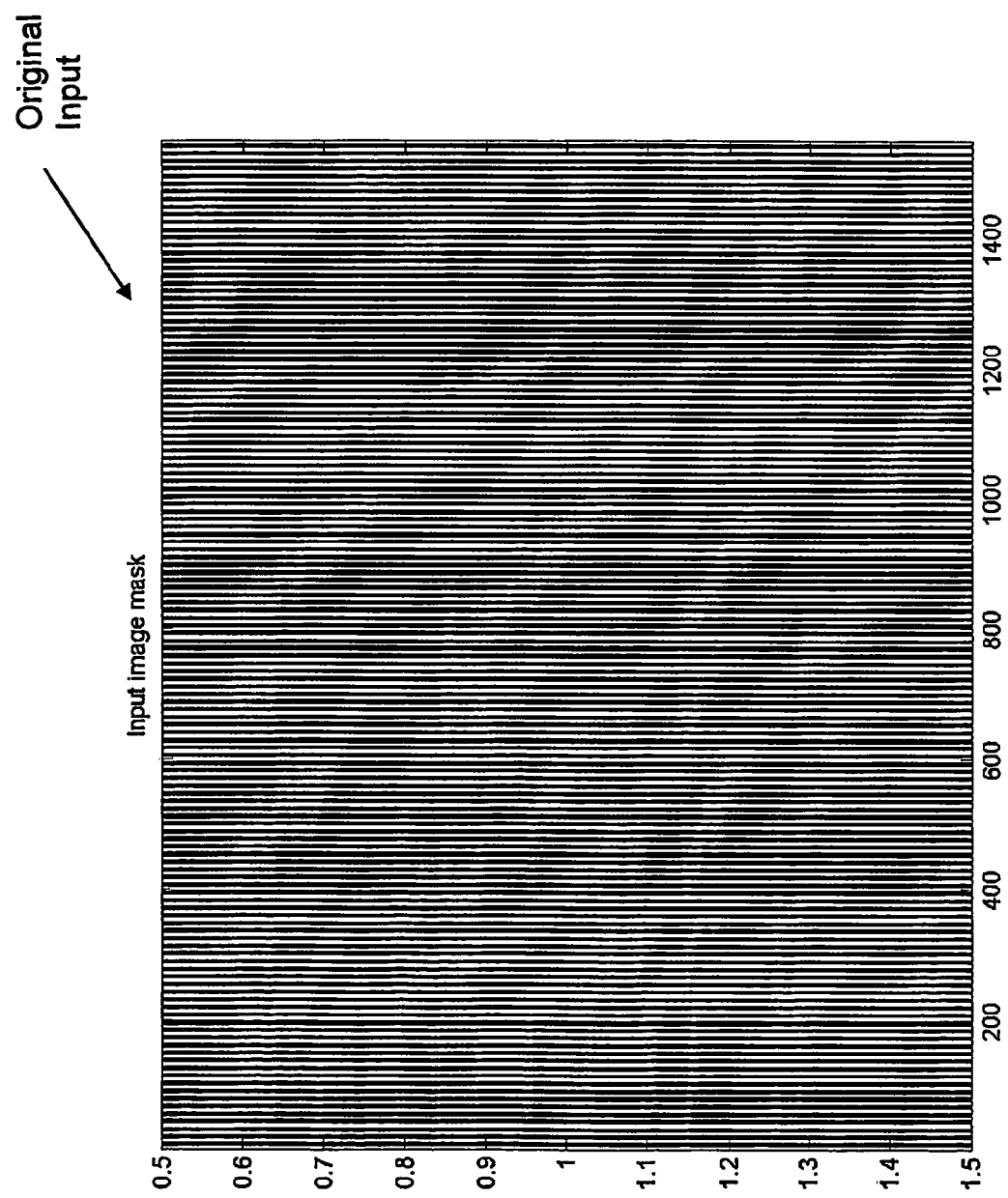
Figure 7B:
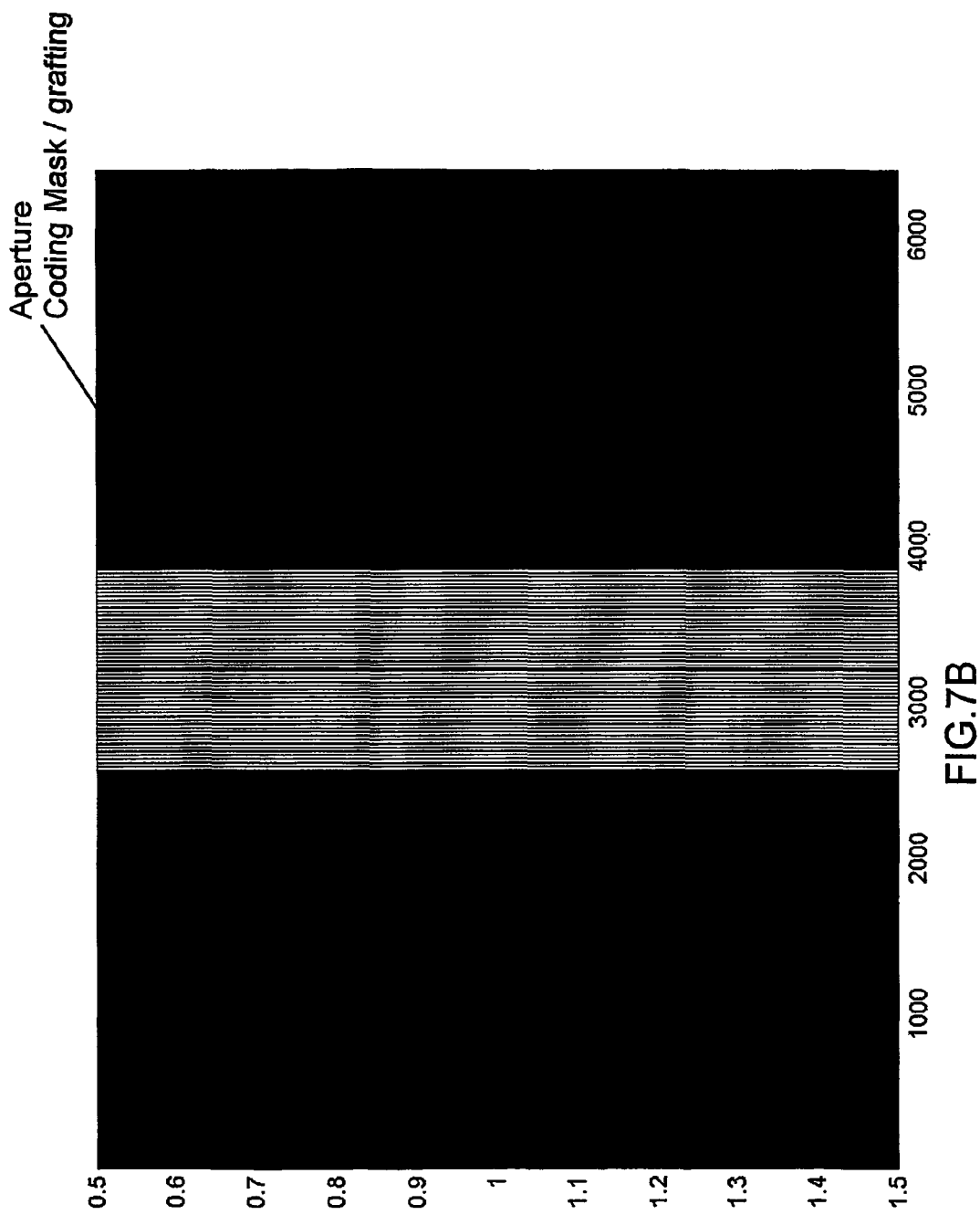

For simplicity, the simulation is one-dimensional. Furthermore, the simulation deals with a coherent system. An input image of a cosine grating was chosen, as shown in FIG. 7A. It should be noted that the figures are also one-dimensional, scales of the results were changed in order to assist appreciation of the results. This cosine grating has a frequency in which the CCD sampling will cause obvious aliasing. The aperture coding mask (constructed as described above) is shown in FIG. 7B. The mask was a third of the size of the lens aperture (D in FIG. 1).

In the simulation, the original input was Fourier transformed, multiplied with the aperture coding mask, and inverse Fourier transformed again. This simulated the aperture coding mask attached to the imaging lens. The magnitude of the so-produced coded signal was sampled according to attributes of the CCD. Signal retrieval was conducted as follows: sampled data (CCD output) was inverse Fourier transformed, multiplied by the aperture coding mask, and Fourier transformed to produce the desired output.

Figure 7C:
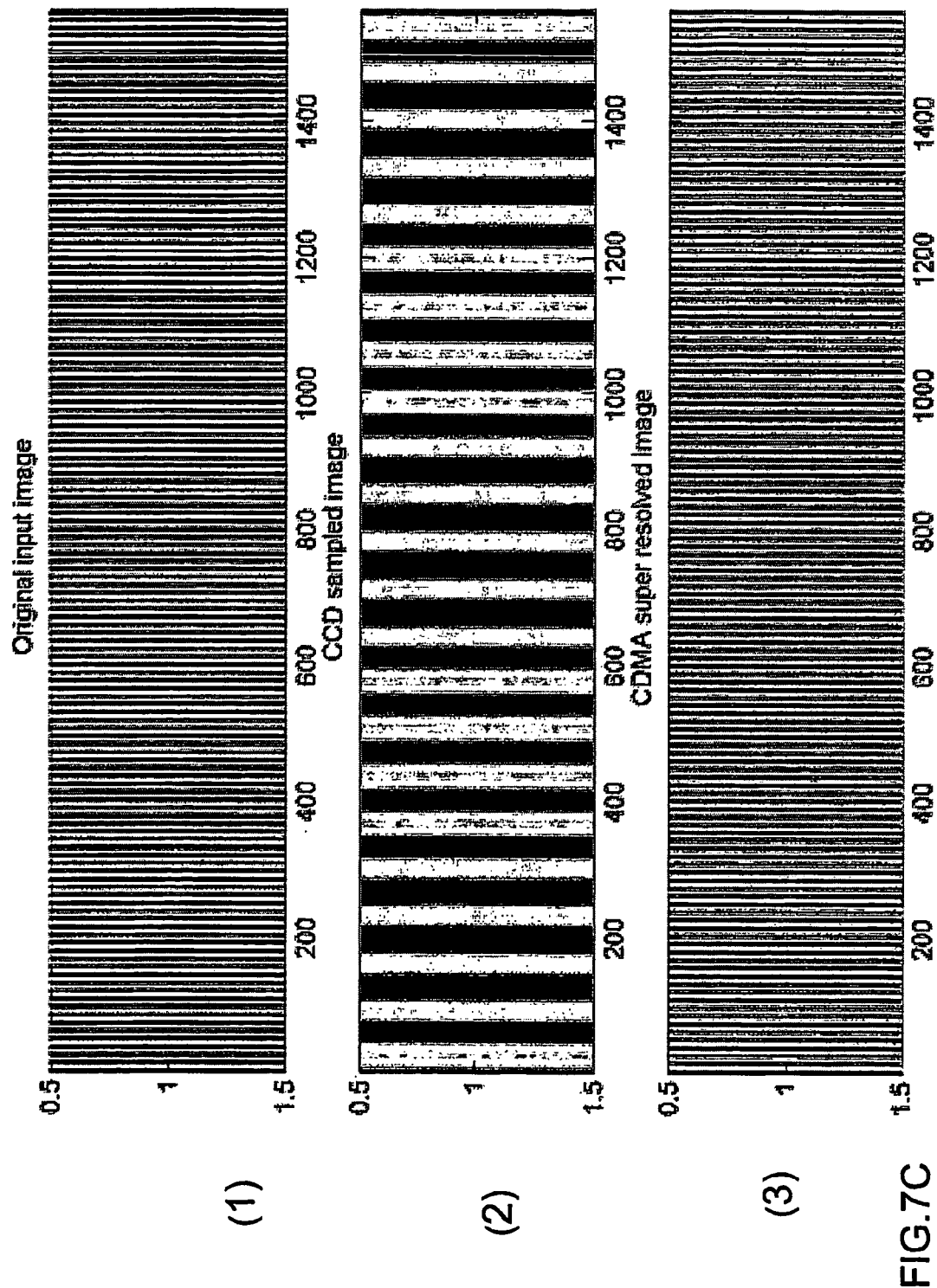

The simulation results are presented in FIG. 7C showing: (1) the ideal output of the system, which is actually the Original Input Image, i.e., object that is to be imaged by the system—cosine grid of FIG. 7A; (2) the CCD sampled output without applying the super resolution method of the invention, in which a complete loss of image resolution is observed and obvious aliasing as the image frequency appears much lower than that of the original object; and (3) the input after reconstruction using the aperture coding super resolution showing that the image was satisfactory reconstructed.

Figure 7D:
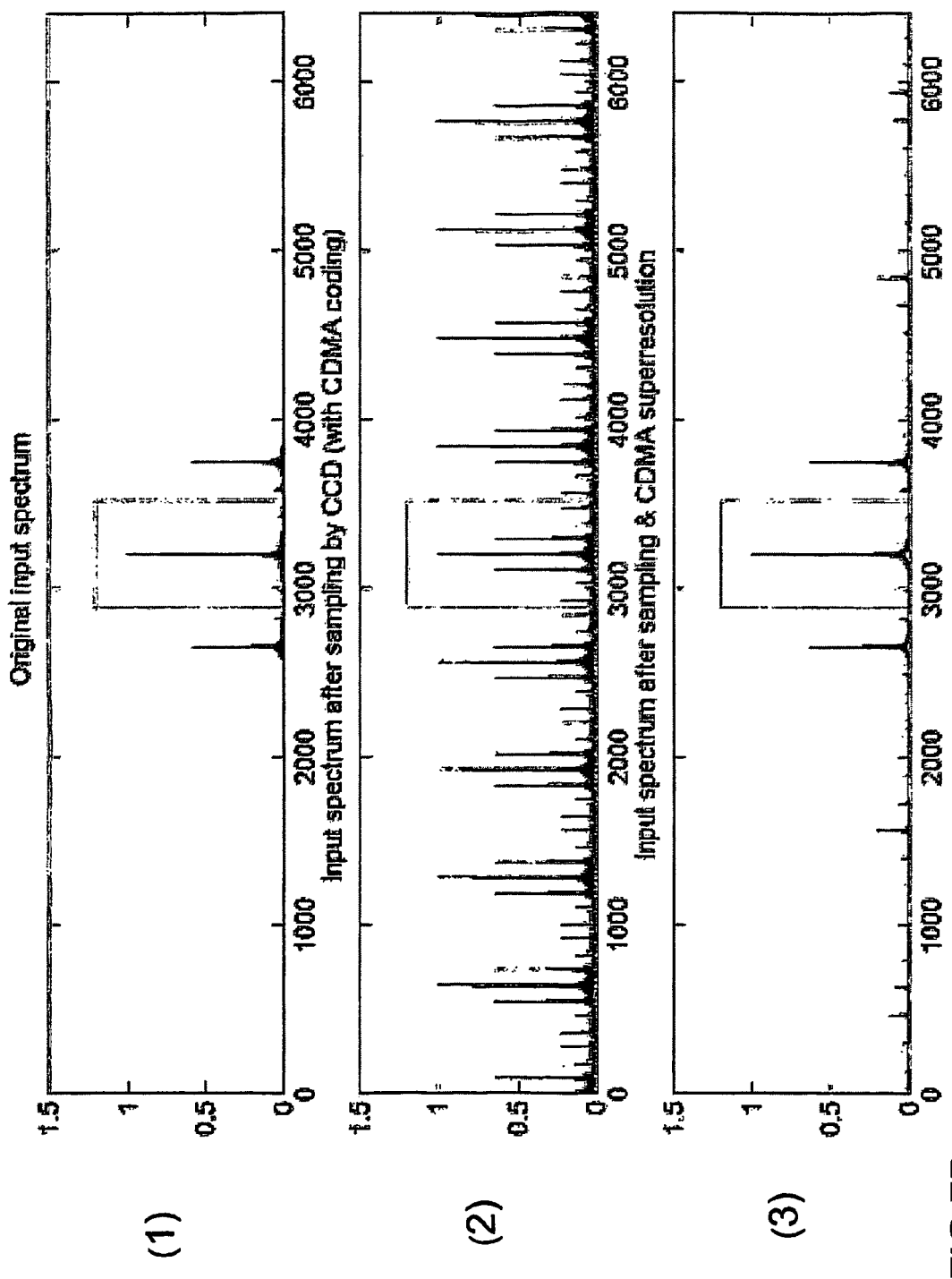

FIG. 7D illustrates the Fourier plane of the system, showing (1) the spectrum of the Original Input Spectrum (cosine grid input); (2) the spectrum of the sampled output—input spectrum after sampling by the CCD while using the aperture coding mask; and (3) signal retrieved using the aperture coding super resolution—input spectrum after sampling and aperture coding super resolution. In the original input spectrum (1), the rectangle illustrates the allowed bandwidth due to sampling by the CCD. To the spectrum of the sampled output (2) many artifacts have been added due to multiplication with the aperture coding mask. As for the retrieved signal, it should be noted that after multiplying the spectrum by the aperture coding mask, all aliased frequencies are removed, and the original input is obtained, i.e. perfect reconstruction.

Figure 8A:
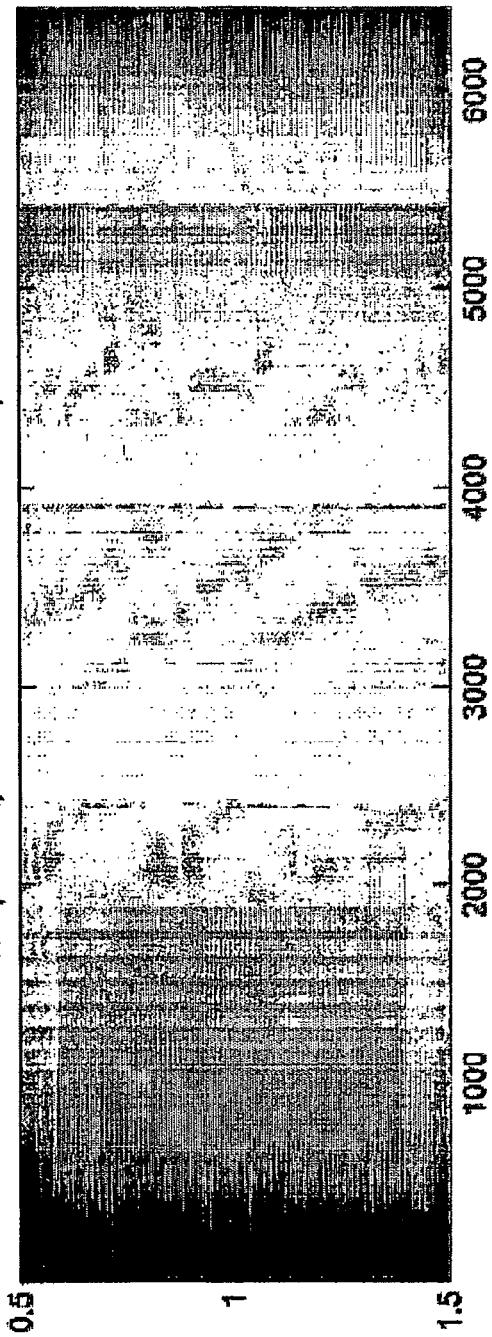
Figure 8B:
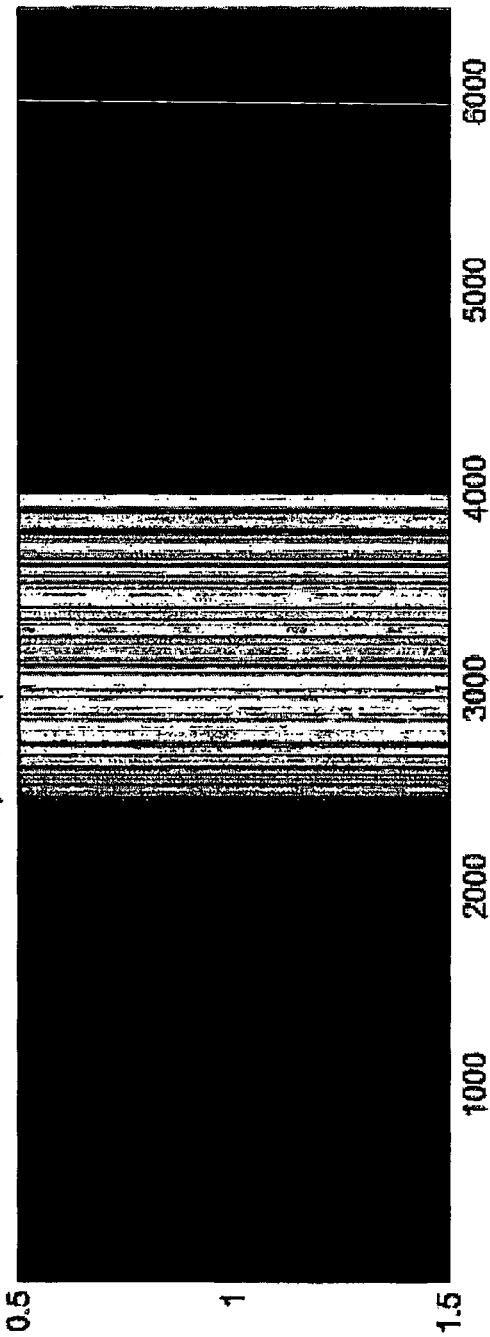
Figure 8C:
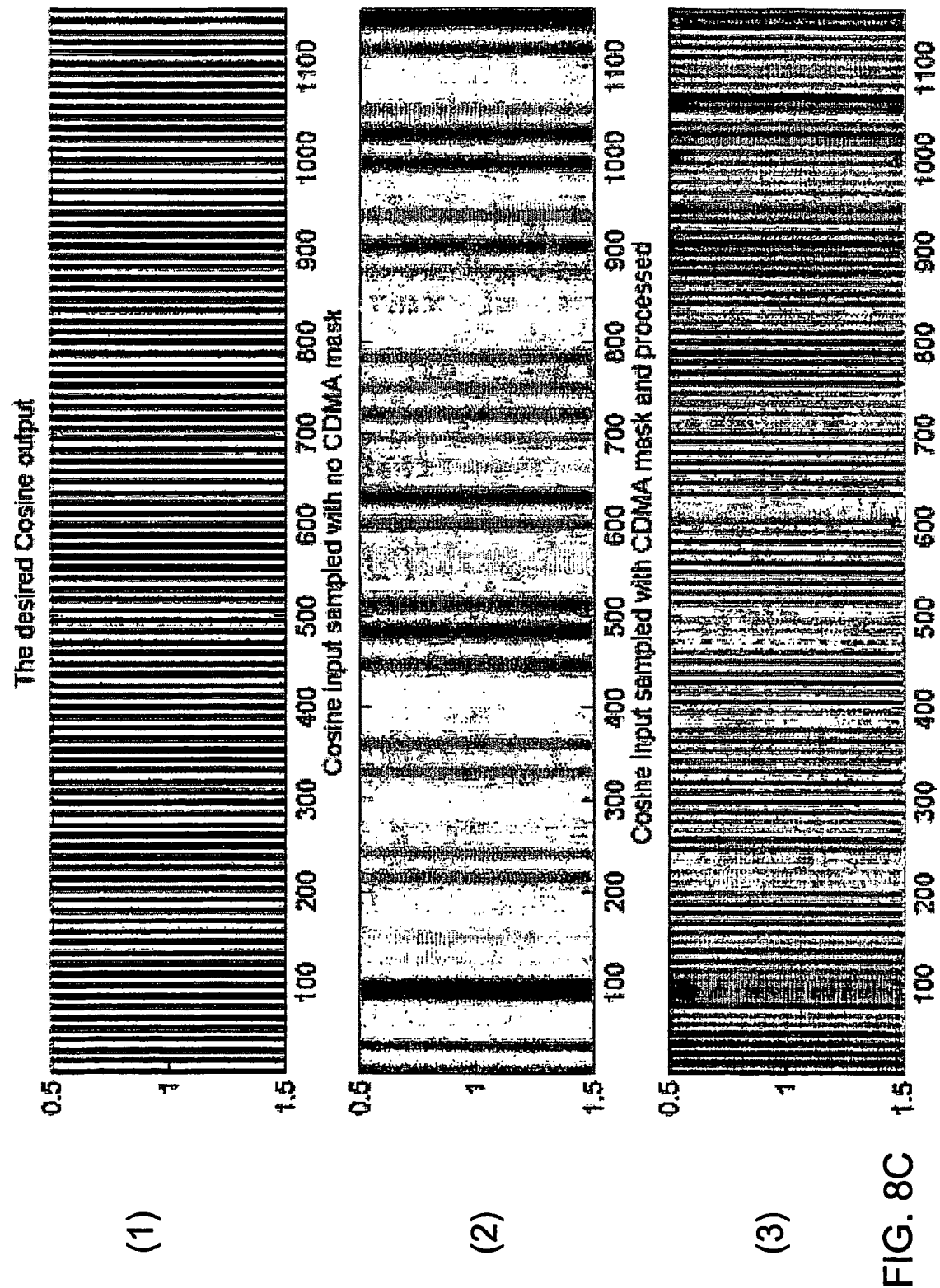

FIGS. 8A to 8C illustrate the experimental results obtained with an experimental setup in the form of a simple imaging system including a single imaging lens, an aperture placed in the focal plane (used to limit system bandwidth), and a CCD detector. An aperture coding mask was used to be attached to the lens. The CCD, with the attributes presented in the above table, sampled the output. The same cosine input grid and aperture coding mask, as were presented in the simulation, were used for the experiment.

FIGS. 8A and 8B show, respectively, the sampled output of the cosine input processed by the aperture coding mask (prior to processing the sampled output); and cosine input sampled by CCD with no aperture coding mask. The expansion of the image due to the usage of the aperture coding mask is apparent when comparing with the output width without such mask.

FIG. 8C shows (1) desired (ideal) cosine output; the sampled output of the cosine input without the aperture coding (this is identical to FIG. 7D (3) but at different scale) demonstrating the obvious aliasing by the appearance of lower frequencies; and (3) the retrieved output using the aperture coding super resolution. This aperture coding technique produced satisfactory results for the reconstruction. It should be noted that a slight degradation of the lower frequencies appearing in the retrieved image (3) might be a result of a small alignment error between the sampled image and the aperture coding mask.

Thus, the technique of the present invention provides a super resolving approach that overcomes geometrical limitations set by the pixel size of a detector. According to this approach, aperture coding is used to exceed geometrical resolution limit. This solution does not involve any additional mechanical elements, has a very simple optical implementation, and provides for operating with either coherent or incoherent light. The technique of the present invention can be used for enhancing resolution of digital cameras, scanners and other imaging related platforms. This technique provides for an optical zoom without using any moving elements. An aperture coding mask can be used to produce a resolution enhancement by factor k sacrificing the field of view by the same factor.

The following is a specific example of the present invention demonstrating the all optical continuous zooming operation where the field of view of the input object is not restricted to the central one third. In this example, the aperture orthogonal coding is such as to generate replications of the input object over the CCD plane, and is configured to provide three times of resolution enhancement (×3 zooming). It should be understood that similar derivation could be applied for any other factor of resolution enhancement.

The aperture diameter and the F-number $F_\#$ are assumed to be such that the high resolution imaging that corresponds to $F_\#$ is obtained only in the central third of the field of view of the image captured by the CCD. While, in the other two thirds, the optical resolution degradation is by a factor of three, i.e. the resolution transition by the optics (OTF) equals to the geometry of the detector. Thus, the optical resolution is three times higher than the geometrical one only in the central third of the field of view. A general effect of higher resolution in the central region of the image is easily achieved in most imaging systems: The imaging lens performs imaging over a spherical surface, while the CCD is a planar surface. Accordingly, the high resolution imaging is obtained only in the center, while at the edges the image gets out of focus and its resolution degrades: the point spread function of the aperture (lens) over the CCD plane becomes shift variant.

The three regions of the field of view are denoted by $S_{-1}(x)$, $S_0(x)$ and $S_1(x)$. In order to realize the super resolution condition (i.e. to achieve the orthogonal coding), a distance between the three replications must be non integer number multiplied by the pixels pitch, i.e., a sub-pixel shift is required. Thus, the images generated in the three replications are basically not identical (their subtraction will not produce nulling).

The size of the aperture of the lens is denoted by D, and the pitch of the pixels in the CCD plane is denoted by $\Delta x$.

As indicated above, only the region $g_0(x)$ has resolution that is three times larger than the geometrical resolution of the detector, and thus:

$$\tilde{S}_{-1}\left(\frac{\mu}{\lambda F}\right) = \int S_{-1}(x)\exp\left(\frac{-2\pi i x\mu}{\lambda F}\right)dx = \tilde{S}_{-1,0}\left(\frac{\mu}{\lambda F}\right)rect\left(\frac{\mu\Delta x}{\lambda F}\right) \quad (27)$$

$$\tilde{S}_1\left(\frac{\mu}{\lambda F}\right) = \int S_1(x)\exp\left(\frac{-2\pi i x\mu}{\lambda F}\right)dx = \tilde{S}_{1,0}\left(\frac{\mu}{\lambda F}\right)rect\left(\frac{\mu\Delta x}{\lambda F}\right)$$

$$\tilde{S}_0\left(\frac{\mu}{\lambda F}\right) = \int S_0(x)\exp\left(\frac{-2\pi i x\mu}{\lambda F}\right)dx = \sum_{n=-1}^{1}\tilde{S}_{0,n}\left(\frac{\mu}{\lambda F}\right)rect\left(\frac{\mu - n\Delta x}{\lambda F}\right)$$

wherein λ is the wavelength, F is the focal length of the imaging lens, and $$\breve{S}_{m,n}\left(\frac{\mu}{\lambda F}\right)$$

is the $n^{th}$ (n=−1, 0, 1) spectral slot distribution of the $m^{th}$ (m=−1, 0, 1) region of the field of view, and μ is the coordinate in the Fourier domain, namely, $$\frac{\mu}{\lambda F} = \nu,$$

and identifying the function by the capital letter signifies the Fourier transform of the function.

In order to obtain the resolution of the central region of the field of view three times higher than the geometry of the detector, the following condition should be satisfied:

$$\frac{\lambda F}{\Delta x} = \frac{D}{3} \tag{28}$$

When passed through the aperture coding mask, each spectrum slot is coded by the proper slot of the coding mask:

$$MA\tilde{S}K\left(\frac{\mu}{\lambda F}\right) = \sum_{n=-1}^{1} \breve{g}_n\left(\frac{\mu - n\Delta x}{\lambda F}\right) = \int M_T(x)\exp\left(\frac{-2\pi ix\mu}{\lambda F}\right)dx \tag{29}$$

wherein $\breve{g}_n$ are coding mask sub-function (in the Fourier domain); $M_T$ is the inverse Fourier of the coding mask function.

The mask as well contains three slots that after the replications of the spectrum yield the desired orthogonality.

At the CCD plane, after the replication process and the sampling:

$$f(x) = \sum_{n=-1}^{n=1} S_n(x) \otimes M_T(x) \cdot \sum_{n} \delta(x - n\Delta x)$$

Now, denoting by $f_m$ the image obtained at the $m^{th}$ region of the field of view at the CCD plane, we obtain:

$$f_{-1}(x) = [(S_{-1}(x) + S_0(x)) \otimes M_T(x)] \cdot \sum_n \delta(x - n\Delta x) \tag{30}$$

$$f_0(x) = [(S_{-1}(x) + S_0(x) + S_1(x)) \otimes M_T(x)] \cdot \sum_n \delta(x - n\Delta x)$$

$$f_1(x) = [(S_1(x) + S_0(x)) \otimes M_T(x)] \cdot \sum_n \delta(x - n\Delta x)$$

wherein $$\sum_k \delta(x - n\Delta x)$$

designates the sampling of the pixel array; and $\otimes$ denotes convolution process.

Performing a Fourier transform over the expression in equation (30) and observing it within the spectral region that corresponds to the geometrical bandwidth (i.e., D/3) provides:

$$\tilde{F}_{-1}\left(\frac{\mu}{\lambda F}\right) = \int f_{-1}(x)\exp\left(\frac{-2\pi ix\mu}{\lambda F}\right)dx \tag{31}$$

$$= \left[\tilde{S}_{-1,0}\left(\frac{\mu}{\lambda F}\right)\breve{g}_0\left(\frac{\mu}{\lambda F}\right) + \sum_{n=-1}^{1} \tilde{S}_{0,n}\left(\frac{\mu}{\lambda F}\right)\breve{g}_n\left(\frac{\mu}{\lambda F}\right)\right]rect\left(\frac{\mu\Delta x}{\lambda F}\right)$$

$$\tilde{F}_0\left(\frac{\mu}{\lambda F}\right) = \int f_0(x)\exp\left(\frac{-2\pi ix\mu}{\lambda F}\right)dx$$

$$= \left[\left(\tilde{S}_{-1,0}\left(\frac{\mu}{\lambda F}\right) + \tilde{S}_{1,0}\left(\frac{\mu}{\lambda F}\right)\right)\breve{g}_0\left(\frac{\mu}{\lambda F}\right) + \sum_{n=-1}^{1} \tilde{S}_{0,n}\left(\frac{\mu}{\lambda F}\right)\breve{g}_n\left(\frac{\mu}{\lambda F}\right)\right]rect\left(\frac{\mu\Delta x}{\lambda F}\right)$$

$$\tilde{F}_1\left(\frac{\mu}{\lambda F}\right) = \int f_1(x)\exp\left(\frac{-2\pi ix\mu}{\lambda F}\right)dx$$

$$= \left[\tilde{S}_{1,0}\left(\frac{\mu}{\lambda F}\right)\breve{g}_0\left(\frac{\mu}{\lambda F}\right) + \sum_{n=-1}^{1} \tilde{S}_{0,n}\left(\frac{\mu}{\lambda F}\right)\breve{g}_n\left(\frac{\mu}{\lambda F}\right)\right]rect\left(\frac{\mu\Delta x}{\lambda F}\right)$$

Due to the orthogonality of the three slots of the mask $$\breve{g}_n\left(\frac{\mu}{\lambda F}\right):$$

$$\breve{g}_n\left(\frac{\mu}{\lambda F}\right) \cdot \breve{g}_m\left(\frac{\mu}{\lambda F}\right) = \begin{cases} 1 & n = m \\ 0 & n \neq m \end{cases} \tag{32}$$

It should be noted that the multiplication result of 1 is considered as that obtained after three times down-sampling, since the resolution was increased by a factor of three due to the orthogonal coding. It should also be noted, although not specifically presented here, that the down-sampling operation is required as well in order to restore the coded information.

Hence, the following solution for the −1 and 1 spectral slots of the central region of the field of view is obtained:

$$\tilde{S}_{0,-1}\left(\frac{\mu}{\lambda F}\right) = \tilde{F}_{-1}\left(\frac{\mu}{\lambda F}\right)\breve{g}_{-1}\left(\frac{\mu}{\lambda F}\right) = \tilde{F}_0\left(\frac{\mu}{\lambda F}\right)\breve{g}_{-1}\left(\frac{\mu}{\lambda F}\right) \tag{33}$$

$$= \tilde{F}_1\left(\frac{\mu}{\lambda F}\right)\breve{g}_{-1}\left(\frac{\mu}{\lambda F}\right)$$

$$\tilde{S}_{0,1}\left(\frac{\mu}{\lambda F}\right) = \tilde{F}_{-1}\left(\frac{\mu}{\lambda F}\right)\breve{g}_1\left(\frac{\mu}{\lambda F}\right) = \tilde{F}_0\left(\frac{\mu}{\lambda F}\right)\breve{g}_1\left(\frac{\mu}{\lambda F}\right)$$

$$= \tilde{F}_1\left(\frac{\mu}{\lambda F}\right)\breve{g}_1\left(\frac{\mu}{\lambda F}\right)$$

and the following is set for the 0 spectral slot of all the three regions of the field of view:

$$\tilde{F}_{-1}\left(\frac{\mu}{\lambda F}\right)\breve{g}_0\left(\frac{\mu}{\lambda F}\right) = \tilde{S}_{-1,0}\left(\frac{\mu}{\lambda F}\right) + \tilde{S}_{0,0}\left(\frac{\mu}{\lambda F}\right) \tag{34}$$

$$\tilde{F}_0\left(\frac{\mu}{\lambda F}\right)\breve{g}_0\left(\frac{\mu}{\lambda F}\right) = \tilde{S}_{-1,0}\left(\frac{\mu}{\lambda F}\right) + \tilde{S}_{0,0}\left(\frac{\mu}{\lambda F}\right) + \tilde{S}_{1,0}\left(\frac{\mu}{\lambda F}\right)$$

$$\tilde{F}_1\left(\frac{\mu}{\lambda F}\right)\breve{g}_0\left(\frac{\mu}{\lambda F}\right) = \tilde{S}_{0,0}\left(\frac{\mu}{\lambda F}\right) + \tilde{S}_{1,0}\left(\frac{\mu}{\lambda F}\right)$$

The solution of those equations yields:

$$\tilde{S}_{-1,0}\left(\frac{\mu}{\lambda F}\right) = \left[\tilde{F}_0\left(\frac{\mu}{\lambda F}\right) - \tilde{F}_1\left(\frac{\mu}{\lambda F}\right)\right]\tilde{g}_0\left(\frac{\mu}{\lambda F}\right) \quad (35)$$

$$\tilde{S}_{0,0}\left(\frac{\mu}{\lambda F}\right) = \left[\tilde{F}_{-1}\left(\frac{\mu}{\lambda F}\right) + \tilde{F}_1\left(\frac{\mu}{\lambda F}\right) - \tilde{F}_0\left(\frac{\mu}{\lambda F}\right)\right]\tilde{g}_0\left(\frac{\mu}{\lambda F}\right)$$

$$\tilde{S}_{1,0}\left(\frac{\mu}{\lambda F}\right) = \left[\tilde{F}_0\left(\frac{\mu}{\lambda F}\right) - \tilde{F}_{-1}\left(\frac{\mu}{\lambda F}\right)\right]\tilde{g}_0\left(\frac{\mu}{\lambda F}\right)$$

Thus, all the required pieces of information are extracted, namely those needed in order to realize ×3 zooming in the central region, while the un-zoomed information of the rest of the regions of the field of view is also available. Hence, by varying digitally the zooming, a continuous zoom may be obtained while the maximal zoom factor of three can be obtained only in the central third of the field of view.

The present invention provides for solving the wavelength sensitivity of the all optical zoom technology. This technique is valid in general in solving the wavelength sensitivity of all diffractive optical elements (DOE).

Considering the above-described example, since the coding mask generates replications on the CCD plane, it is sensitive to the wavelength of the illumination. Different wavelength will generate different spacing between the replications. Given a grating with a period of $\mu_0$ that is attached to the aperture of an imaging lens, the distance between replications will be $\lambda F/\mu_0$. Since it is linear to the wavelength $\lambda$ and assuming that the spectral bandwidth of wavelengths is $\Delta\lambda$, the obtained image in the left and right third of the field of view will be convolved with the illumination spectrum $L(\lambda)$. This means that the spatial spectrum is multiplied by the Fourier transform of the illuminating spectrum $L(\lambda)$:

$$\hat{\tilde{F}}_{-1}\left(\frac{\mu}{\lambda F}\right) = \tilde{F}_{-1}\left(\frac{\mu}{\lambda F}\right) \cdot \tilde{L}\left(\frac{\mu}{\lambda \mu_0}\right) \quad (36)$$

$$\hat{\tilde{F}}_1\left(\frac{\mu}{\lambda F}\right) = \tilde{F}_1\left(\frac{\mu}{\lambda F}\right) \cdot \tilde{L}\left(\frac{\mu}{\lambda \mu_0}\right)$$

$$\tilde{L}(\mu) = \int L(\lambda)\exp(-2\pi i\lambda\mu)d\lambda$$

wherein $$\hat{\tilde{F}}_{-1}\left(\frac{\mu}{\lambda F}\right), \hat{\tilde{F}}_1\left(\frac{\mu}{\lambda F}\right)$$

are the spatial spectral distributions of the left and right thirds of the field of view obtained due to the polychromatic illumination. In the monochromatic case they are equal to, respectively, $$\tilde{F}_{-1}\left(\frac{\mu}{\lambda F}\right), \tilde{F}_1\left(\frac{\mu}{\lambda F}\right).$$

The width of this spectrum is $\Delta d$ and thus the images will be smeared and the spatial resolution will be decreased to $(\Delta\lambda)F/\mu_0$. For all the cases where $(\Delta\lambda)F/\mu_0 > \Delta x$, the all optical zooming will be damaged. Considering that $\lambda F/\mu_0 = 100\Delta x = 1$ mm, $\lambda = 532$ nm, $\Delta\lambda = 200$ nm, we have: $(\Delta\lambda)F/\mu_0 = 37.5\Delta x > \Delta x$.

To solve this problem, a spectral filter is used that blocks part of the wavelength's spectrum such that the illuminating spectrum (in Fourier domain)

$$\tilde{L}\left(\frac{\mu}{\lambda \mu_0}\right)$$

will not exhibit zeros and it will allow usage of the inverse filtering theorem, i.e., to divide $$\hat{\tilde{F}}_{-1}\left(\frac{\mu}{\lambda F}\right), \hat{\tilde{F}}_1\left(\frac{\mu}{\lambda F}\right) \text{ by } \tilde{L}\left(\frac{\mu}{\lambda \mu_0}\right)$$

in order to obtain $$\tilde{F}_{-1}\left(\frac{\mu}{\lambda F}\right), \tilde{F}_1\left(\frac{\mu}{\lambda F}\right).$$

Figure 9:
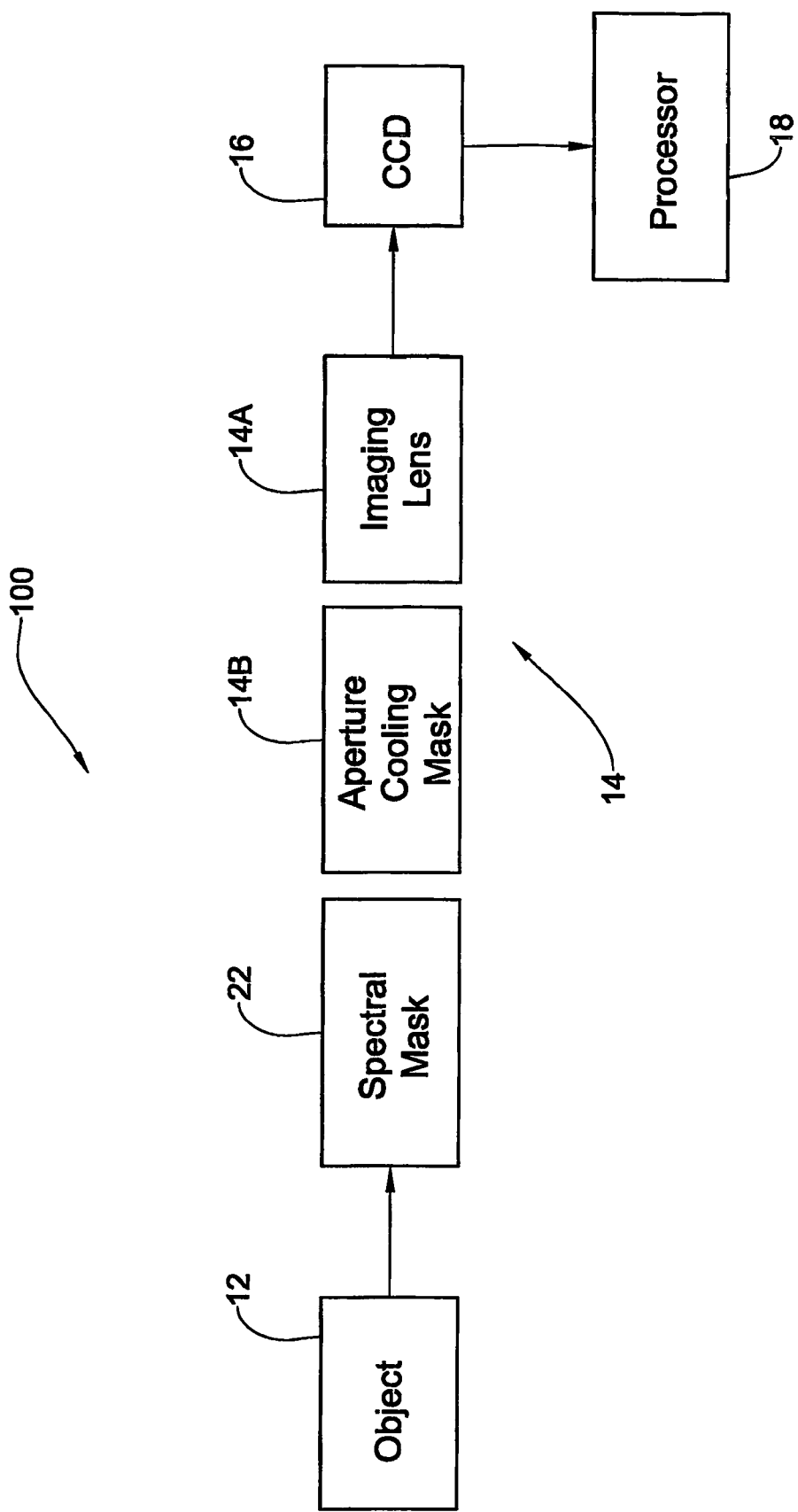
FIG. 9 schematically illustrates another example of the imaging system of the present invention utilizing spectral filtering and aperture coding.

This is illustrated in FIG. 9 showing an imaging system, generally at 100, which is configured generally similar to system of FIG. 1, distinguishing therefrom in that a spectral mask 22 (color filtering mask) is used. The mask 22 may be placed anywhere in the optical path of light propagating from the object to the detector, e.g., it may be part of the aperture coding mask 14B or part of the detector 16. In the present example, the mask 22 is placed upstream of the aperture coding mask 14B. The mask 22 is basically a spectral filter that blocks part of the wavelengths and transmits others. The mask 22 has wavelength blocking slots arranged such that the system operation (including digital processing of the sampled output of the detector) generates a wavelength insensitive diffractive optical element.

The algorithm for designing an optimal spectral mask is generally aimed at providing the maximal energy and maximal contrast in the mask output, the maximal contrast meaning that the Fourier transform of the blocking mask function is bounded away from zero as much as possible. Thus, the main steps of the algorithm suitable to be used in designing the mask 22 is as follows: The mask 22 has to be formed with H spectral blocking slots, each having a spectral width of $\delta\lambda$ and spectral positions of $\lambda_1, \lambda_2, \ldots \lambda_H$. A predetermined value of H is selected, and a search is made for position values $\lambda_1, \lambda_2, \ldots \lambda_H$ and the blocking width $\delta\lambda$ for which the absolute value of the Fourier transform of the blocking mask (denoted by $|W(v)|$) is bounded away from zero as much as possible. The search may be random, i.e., the minimal value of $|W(v)|$ in the spectral region of interest is computed for all the possibilities of the various parameters $\delta\lambda$ and $\lambda_h$, or a more methodical search algorithm may be applied. The inventors performed simulations utilizing a random search that just cover all the possibilities and chose the optimal set of parameters. From the energy considerations, on the one hand, it is desirable that each width $\delta\lambda$ and the number of the blocking periods H is as small as possible since $\delta\lambda$ and H are proportional to the energy blocked by the mask, while on the other hand, this must be traded off against the condition that $|W(v)|$ be bounded away from zero.

For simplicity, it is assumed that the length of the blocking mask shall have eight segments. Each segment can either block the energy or transmit it. A search is made for all possible mask combinations ($2^8 = 256$ possibilities) such that the minimal value of the Fourier transform shall be bounded away from zero as much as possible. From the introduced energy considerations, the maximal energy that is blocked by the filter should not exceed 35% (obviously this limits the number of possible cases). This means that the blocking mask should have at least 5 transmission segments (and the rest can be blocking segments). The term "transmission" signifies that the mask equals 1 at those segments, and the term "blocking" means that it equals 0. The position of transmission regions is part of the algorithm that searches for the optimal masking.

Since the wavelength distribution of the illumination, $L(\lambda)$, could be predicted, proper optimization of the blocking mask as well as proper post processing could be realized. After selecting the optimal spectral wavelength-blocking segments, the de-blurring operation is as follows:

The distorted smeared image is captured after applying the wavelengths blocked readout process. This image is Fourier transformed and divided by the Fourier transform of the wavelength blocking mask [W(v)]. This is an inverse filtering procedure. A Wiener filter may be constructed when noise is present. An inverse Fourier transform is computed which obtains the undistorted spatial image.

Figure 10A:
Figure 10B:
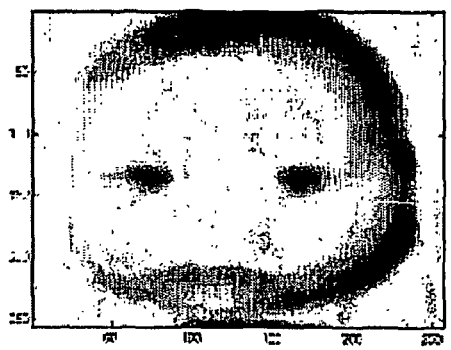
Figure 10C:
Figure 10D:
Figure 10E:
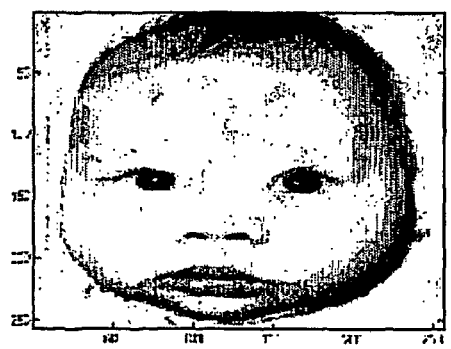

Reference is made to FIGS. 10A-10E exemplifying experimental results. FIG. 10A presents an original input image. In FIG. 10B, the image is blurred due to the use of polychromatic illumination. The smearing width $(\Delta\lambda)F/\mu_0$ was $16\Delta x$. FIG. 10C shows the results of inverse filtering (de-convolution without masking) with a threshold of 1% (which might not be possible because of noise). FIG. 10D exemplifies, for comparison purposes, the same with a threshold of 10%. FIG. 10E shows the results obtained when the proper blocking mask (22 in FIG. 9) is used and de-convolution is applied while the threshold can be up to 20% (in this case there is no problem with noises). It should be noted that the term "threshold" used herein signifies a relative value (in comparison to the maximal value) that is added to the denominator in order to allow performing the inverse filtering computation.

Figure 11A:
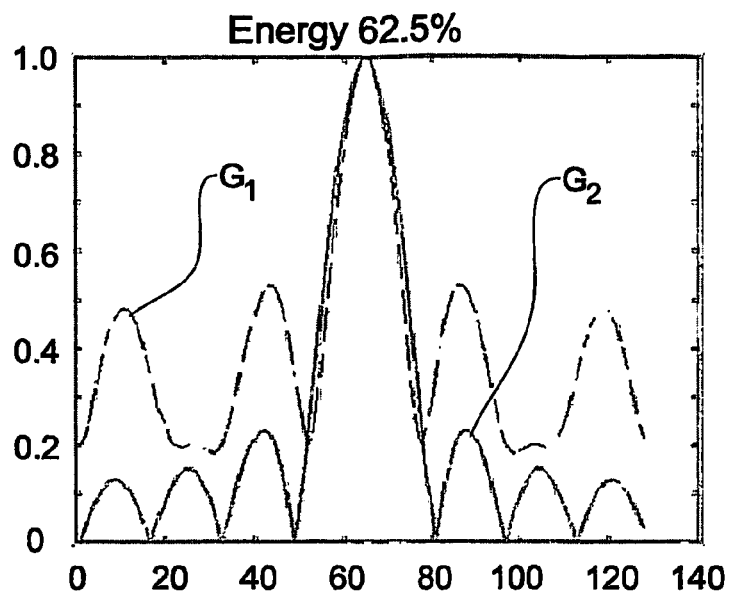
FIGS. 11A and 11B exemplify the illumination function (in Fourier domain) of spectral masks that transmit, respectively, 62.5% and 87.5% of the energy.
Figure 11B:
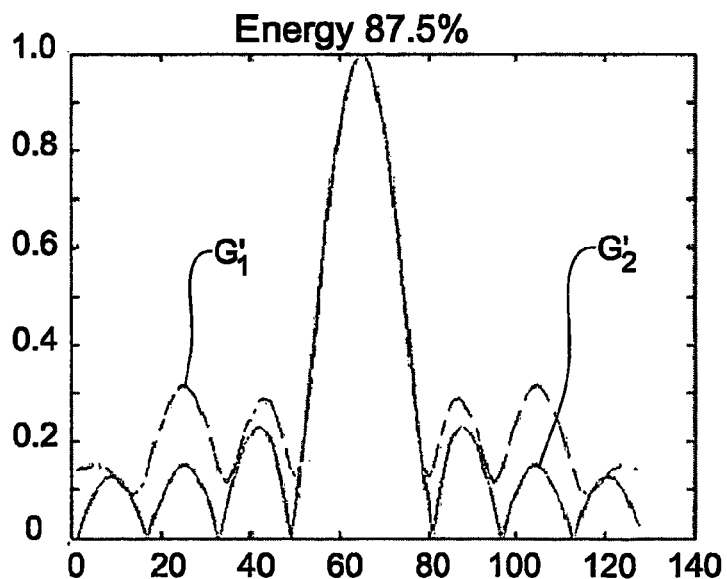

FIGS. 11A and 11B present the illumination function (in Fourier domain)

$$\tilde{L}\left(\frac{\mu}{\lambda\mu_0}\right)$$

for the cases where the mask transmits, respectively, 62.5% and 87.5% of the energy. Graphs $G_1$ and $G'_1$ correspond to the spectral response obtained with the 62.5%- and 87.5%-transmission masks, respectively, and graph $G_2$ corresponds to the spectral response obtained with no such mask. The minimal spectral value in graph $G_1$ (62.5%-tranmission mask) is higher (20%), but for the 87.5%-transmission mask this value can also be high enough (more than 10%) as compared that of no mask. This value corresponds to the threshold in the inverse filtering computing.

Figure 12:
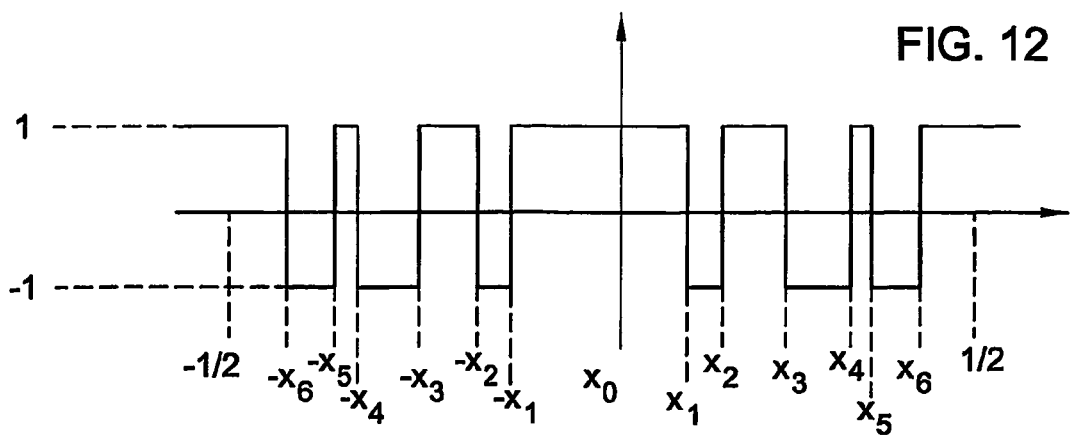
FIG. 12 exemplifies a grating function of a phase only aperture coding mask.

The following is yet another example of the invention, where the aperture coding is orthogonal Dammann coding. Dammann grating is an analytical approach for realizing a desired spot distribution at the Fourier plane by using a binary phase only grating. The transition points between −1 to 1 transparency value are computed by solving equations set yielding the required spot structure. Dammann grating is a periodic structure having a symmetric basic period. The solution for a grating with one period, within the interval [0÷0.5] is obtained as follows:

Referring to FIG. 12, there is illustrated a grating function, $G(x)$, as a combination of rect functions:

$$G(x) = \sum_{j=1}^{J} (-1)^j rect\left[\frac{x - (x_{j+1} + x_j)/2}{x_{j+1} - x_j}\right] \quad 0 \leq x \leq 0.5 \quad (37)$$

wherein J is a number of transition (within [0≤→0.5]) at which g(x) changes between +1 and −1.

Assuming that the grating function g(x) is infinitively periodic allows for expressing it as a Fourier series:

$$G(x) = \sum_{m=-\infty}^{\infty} A_m \exp(2\pi i m x) \quad (38)$$

wherein the coefficients $A_m$ constitute the complex amplitudes of the diffraction orders in the Fourier plane:

$$A_m = 2\int_0^{0.5} G(x)\cos(2\pi m x)dx \quad (39)$$

Substituting equation (37) into equation (39) yields:

$$A_0 = 4\sum_{j=1}^{J}(-1)^{j+1}x_j + (-1)^{J+1} \quad (40)$$

$$A_m = \frac{2}{m\pi}\sum_{j=1}^{J}(-1)^{j+1}\sin(2\pi m x_j) \quad m \neq 0$$

wherein $A_m$ are the coefficients and $x_m$, are the transition points of the Dammann grating as shown in FIG. 12. Solving the iterative transition points equations set yields the desired spot distribution in the Fourier plane.

As described above, the simplified orthogonal coding mask generates replications of the image over the CCD plane. In the 2-D case and for the classical orthogonal mask, for the case of ×3 zooming, the central replication is 9 times stronger than the replications in the 1 and −1 regions of the field of view (diffraction orders). A phase only Dammann grating used as the coding mask provides for higher energetic efficiency since it is a phase only mask. In the present example, the Dammann grating (coding mask) is designed to generate 3 by 3 energetically equal replications. After capturing the images by the CCD, each replication is normalized by the proper constant factor such that in the Fourier domain the desired orthogonality is achieved just as with the regular orthogonal mask described above. Thus, the Dammann grating is used in order to obtain high energetic throughput. Then, after capturing the image, the required normalization is performed per each replication such that the original orthogonal coding mask is obtained and the decoding algorithm (described above) remains unchanged.

It should be noted that since the replications are positive, the phase only Dammann mask operates well for coherent as well as spatially incoherent type of illumination.

The design of the proper Dammann grating should be done similar to that of the regular orthogonal mask, namely, as a function of resolution enhancement factor k, a number N of pixels in the CCD field of view, the pixel pitch $\Delta x$, a distance V between the lens and the CCD plane, and preferably wavelength $\lambda$. The basic period of the Dammann must be:

$$\mu_0 = \frac{\lambda V k}{N \Delta x} \quad (41)$$

and keeping in mind that the imaging condition is fulfilled as well:

$$\frac{1}{u} + \frac{1}{V} = \frac{1}{F} \quad (42)$$

where u is the distance between the object and the imaging lens, and F is the focal length of the lens. For most imaging cases, V is approximately equal to F.

As indicated above, the number N of pixels in the field of view is not exactly the number of the pixels in the CCD. The number N of pixels in the field of view must be chosen such that it fulfils:

$$N = Mk + 1 \quad (43)$$

wherein M is an integer such that equation (43) provides N as close as possible to the number of pixels in the CCD.

The field of view is limited by the factor k, which is identical to the expected resolution improvement.

It should be noted that the condition for the field of view (N) is also related to the wavelength as described by equation (41) above. Thus, assuming that three discrete wavelengths are used: $\lambda_R = 633$ nm, $\lambda_G = 532$ nm and $\lambda_B = 450$ nm, the condition of equation (43) will become the following:

$$M_1 k + 1 = N \quad (44A)$$
$$M_2 k + 1 = \frac{\lambda_G}{\lambda_R} N$$
$$M_3 k + 1 = \frac{\lambda_B}{\lambda_R} N$$

wherein $M_1$, $M_2$ and $M_3$ are integers.

It should be understood that the above is a specific example of three wavelengths, wherein $\lambda_R$ is a "reference" wavelength for which the optical mask is designed, namely, for which the optimal mask operation (spatial spreading) is optimal. For the most general case of n wavelength $\lambda_1, \ldots, \lambda_n$, with $\lambda_1$ being the reference wavelength, we have:

$$M_1 k + 1 = N \quad (44B)$$
$$M_2 k + 1 = \frac{\lambda_2}{\lambda_1} N$$
$$\ldots$$
$$M_n k + 1 = \frac{\lambda_n}{\lambda_1} N$$

Assuming also that k=3 and that N is approximately 490 pixels. The optimal solution obtained after search for the $M_i$ (i=1,2,3) integers that solve equation (44) is: $M_1=162$, $M_2=136$ and $M_3=115$ which yields N=487. Thus, this numeric search for integers $M_i$ following equation (44) may provide optimal solution (in respect of orthogonality of coding) for several wavelengths simultaneously.

The presented algorithm provides obtaining continuous optical zooming, starting from ×1 up to the maximal factor k for which the mask was designed, for using single image and proper digital decoding algorithmic. The presented improvement over the conventional zooming does not contradict the information theory (channel capacity), since in the case where no trade off is made in the field of view (as proved by equations 27-36) the increase in the amount of spatial pixels comes on the extent of energy loses or decrease in the dynamic range such that the channel capacity is preserved. In case where the input object occupies 1/k of the field of view (payment is made in the field of view), no losses in dynamic range or energy is created.

Thus, the suggested approach actually generalizes the existing zooming apparatus by providing the desired zooms out of a single image. It should be noted that the payment in the dynamic range is never more than 1 bit since the generated increase in the number of spatial pixels is never more than a factor of 2.

Thus, the technique of the present invention provides a super resolving approach that overcomes geometrical limitations set by the pixel size of a detector. According to this approach, aperture coding is used to exceed geometrical resolution limit. This solution does not involve any additional mechanical elements, and has a very simple optical implementation. This technique is proven mathematically, simulated and eventually verified experimentally. The technique of the present invention can be used for enhancing resolution of digital cameras, scanners and other imaging related platforms. This technique provides for an optical zoom without using any moving elements. An aperture coding mask can be used to produce a resolution enhancement by a factor N sacrificing the field of view by the same factor.

The technique of the present invention can also be used in the optical Code Division Multiple Access (CDMA) schemes (i.e., in optics communication). CDMA technology focuses primarily on the "direct sequence" method of spread spectrum. Direct sequence is spread spectrum technology in which the bandwidth of a signal is enlarged by artificially increasing the bit data rate by breaking each bit into a number of sub-bits ("chips"). The signal is divided up into smaller bits by multiplying it by a Pseudo-Noise (PN) code. A simple multiplication of each bit of the original modulated signal by this high data rate PN-code yields the division of the signal into smaller bits (which increases its bandwidth). Increasing the number of "chips" expands the bandwidth proportionally. Turning back to FIG. 1, the coding mask 14B attached to the aperture of the imaging lens 14A will be now a periodic filter structure operated at the temporal spectrum of the temporally modulated optical signal. The filter 14B will use the aliasing generated due to the slow temporal sampling of the detector and resolve the high frequency information. Thus, in the optical communication scheme (transmitter/receiver), each of multiple transmitters generates a light signal, which is data modulated and then uniquely coded (passed through the respective mask 14B) to be thus multiplied by its own unique Pseudo-Noise code, and is transmitted through the network. Since various signals might be simultaneously transmitted from different transmitters, these transmissions can be represented by simply adding their spectra. At the receiver end, the incoming signal is the spread spectrum signal. In order to extract a single data message, the incoming signal is multiplied by the corresponding code. Multiplying a given code by itself will produce unity. Therefore, by multiplying the signal by the unique code, the spread spectrum effects for that particular message are eliminated. The resulting signal is then passed through a band pass filter (BPF) centered at the carrier frequency. This operation selects only the desired signal while rejecting all surrounding frequencies due to other messages in the spread spectrum.

This scheme is used extensively in communication to provide multi-user access where each user uses a unique PN code. This method provides a rather significant single tone interference immunity, which is important in imaging, and a trivial optical implementation (a simple binary mask).

Those skilled in the art will readily appreciate that various modifications and changes can be applied to the embodiments of the invention as hereinbefore exemplified, without departing from its scope defined in and by the appended claims.

The invention claimed is:

1. A method for imaging an object with image resolution for at least a part of the object exceeding by a predetermined factor a geometrical resolution defined by a detector pixel array, the method comprising applying an optical processing to the wavefront of a light signal indicative of at least a part of the object to be imaged with the enhanced resolution, while propagating towards the detector pixel array, said optical processing being predetermined in accordance with said predetermined factor of resolution enhancement, aliasing effect occurring in the detector plane and to provide orthogonality of spectral data indicative of a sampled output of the detector, to thereby enable digital processing of the sampled output corresponding to a single captured image to reconstruct the image of said at least part of the object with the resolution enhanced by said factor, wherein the optical processing includes processing the wavefront with a function of the following parameters: the factor k of the resolution enhancement, a number N of pixels in a field of view of the detector, a pixel pitch $\Delta x$ of the detector, and a distance V between an imaging lens and the detector plane, the number N of pixels in the detector field of view is selected to satisfy a condition that: N=Mk+1, for a specific wavelength for which the aperture coding is designed, wherein M is an integer providing the value of N to be as close as possible to a number of pixels in the detector.

2. The method of claim 1, wherein said optical processing comprises applying to said wavefront an aperture coding predetermined in accordance with the aliasing effect such as to provide the orthogonality of spectral data indicative of the sampled output of the detector.

3. The method of claim 2, wherein said predetermined aperture coding is applied to the light signal while in a spectral plane defined by a location of an imaging lens arrangement of an imaging system.

4. The method of claim 1, wherein the optical processing includes processing the wavefront with a function, Fourier transform of which is real and non-negative.

5. The method of claim 1, wherein the number N of the detector pixels in the field of view is limited by the factor k of the resolution enhancement.

6. The method of claim 1, wherein the optical processing of said wavefront produces a spatially spread distribution of the at least part of the light signal on the detector plane.

7. The method of claim 6, wherein said spatial spread distribution is produced by providing a predetermined number of replications of the wavefront of said light signal.

8. The method of claim 1, wherein said predetermine optical processing comprises passing the light signal through an orthogonal optical mask.

9. The method of claim 1, wherein said predetermined optical processing comprises passing the light signal through an optical mask configured to provide orthogonality of normalized sampled output of the detector.

10. The method of claim 9, wherein said optical processing includes phase coding of the wavefront.

11. The method of claim 8, wherein said optical processing includes amplitude coding of the wavefront.

12. The method of claim 3, wherein said predetermined optical processing comprises multiplying the wavefront of the light signal by the predetermined aperture code, thereby producing a spatial spread spectrum of the light signal on the detector plane.

13. The method of claim 3, wherein said predetermined optical processing comprises multiplying the wavefront of the light signal by the predetermined aperture code, thereby generating replications of said at least part of the object over the pixel array plane.

14. The method of claim 12, comprising decoding of the sampled output by multiplying the sampled output by said predetermined aperture code.

15. The method of claim 1, wherein the optical processing defines a function divided into sub-functions, a number of the subfunctions being equal to the factor by which the resolution is to be enhanced.

16. A method for imaging an object with image resolution for at least a part of the object exceeding by a predetermined factor a geometrical resolution defined by a detector pixel array, the method comprising applying an optical processing to the wavefront of a light signal indicative of at least a part of the object to be imaged with the enhanced resolution, while propagating towards the detector pixel array, said optical processing being predetermined in accordance with said predetermined factor of resolution enhancement, aliasing effect occurring in the detector plane and to provide orthogonality of spectral data indicative of a sampled output of the detector, to thereby enable digital processing of the sampled output corresponding to a single captured image to reconstruct the image of said at least part of the object with the resolution enhanced by said factor, the optical processing comprising passing the light signal through a mask composed of an infinite train of delta-functions.

17. The method of claim 16, comprising applying spectral filtering to the light signal, such that said spectral filtering and the processing of the sampled output of the detector generate together a wavelength insensitive diffractive optical element.

18. The method of claim 17, wherein the spectral filtering comprises passing the light signal through a wavelength mask configured to block some of wavelengths and transmit the other wavelengths.

19. The method of claim 17, wherein the wavelength mask is a part of the aperture coding mask carrying out said optical processing.

20. The method of claim 17, wherein the wavelength mask is a part of the pixel array detector.

21. The method of claim 17, wherein the wavelength mask comprises a pattern formed by an array of H wavelength blocking slots, each having a certain spectral width, $\delta\lambda$, and having predetermined spectral positions, $\lambda_1, \lambda_2, \ldots \lambda_H$, respectively.

22. The method of claim 21, wherein the number H of the blocking slots, their optimal spectral positions $\lambda_1, \lambda_2, \ldots \lambda_H$, and the blocking slot width $\delta\lambda$ are selected such as to provide for maximal energy and maximal light contrast in the output of the wavelength mask.

23. The method of claim 22, wherein the number H of the blocking slots, their optimal spectral positions $\lambda_1, \lambda_2, \ldots \lambda_H$, and the blocking slot width $\delta\lambda$ are selected such that an absolute value of a Fourier transform of the wavelength mask function is bounded away from zero as much as possible.

24. The method of claim 22, wherein said selection includes searching for the spectral positions, $\lambda_1, \lambda_2, \ldots \lambda_H$, and the blocking slot width $\delta\lambda$, corresponding to the selected value of H.

25. The method of claim 24, wherein said search is random.

26. The method of claim 24, wherein said search comprises determining a minimal value of the Fourier transform of the wavelength mask function in a spectral region of interest, for all possibilities of the various values of $\delta\lambda$ and $\lambda_h$.

27. The method of claim 1, wherein said optical processing is motionless.

28. A system for imaging an object with a detector pixel array, the system being configured for providing image resolution for at least a part of the object exceeding by a predetermined factor a geometrical resolution defined by the detector pixel array, the imaging system comprising an imaging lens assembly and an aperture coding utility configured to create a real and non-negative image of the object in the detector plane, the aperture coding utility being located at a predetermined location with respect to the imaging lens assembly and being configured to define a predetermined pattern of spaced-apart regions with different optical properties, said pattern being configured in accordance with the factor of resolution enhancement and aliasing occurring in the detector plane and to provide orthogonality of spectral data indicative of a sampled output of the detector, to thereby enable using the aperture code to decode the sampled output to reconstruct the image of said at least part of the object with the resolution enhanced by said factor, wherein said pattern of the aperture coding utility is a function of the predetermined factor k of the resolution enhancement, a number N of pixels in a field of view of the detector, a pixel pitch $\Delta x$ of the detector, and a distance V between the imaging lens assembly and the detector plane, the number N of the detector pixels in the field of view being limited by the factor k of the resolution enhancement, the number N of pixels in the detector field of view being selected to satisfy a condition that: N=Mk+1, for a specific wavelength for which the aperture coding utility is designed, wherein M is an integer providing the value of N to be as close as possible to a number of pixels in the detector.

29. The system of claim 28, wherein the aperture coding utility is accommodated in an optical path of a light signal coming from the object, the aperture coding utility thereby processing a wavefront of said light signal to produce a spatial spread distribution of at least part of said light signal on the detector plane.

30. The system of claim 28, comprising a processor unit connectable to the detector and operable to carry out said decoding by processing the data indicative of the sampled output of the detector using said aperture code.

31. The system of claim 28, wherein the aperture coding utility is operable as an optical mask.

32. The system of claim 31, wherein the aperture coding utility comprises the optical mask that has said pattern of regions with different optical properties.

33. The system of claim 32, wherein the optical mask is accommodated upstream or downstream of the imaging lens assembly.

34. The system of claim 33, wherein the optical mask is integral with the imaging lens assembly.

35. The system of claim 32, wherein the optical mask is in the form of the pattern on a surface of the imaging lens assembly.

36. The system of claim 32, wherein the aperture coding utility includes a spatial light modulator (SLM) operable as the optical mask.

37. The system of claim 36, wherein the SLM is accommodated upstream or downstream of the imaging lens assembly.

38. The system of claim 36, wherein the SLM is integral with the imaging lens assembly.

39. The system of claim 32, wherein the optical mask is an amplitude coding mask.

40. The system of claim 32, wherein the optical mask is a phase coding mask.

41. The system of claim 40, wherein the phase coding mask is a Dammann grating.

42. The system of claim 32, wherein the optical mask is configured such that a Fourier transform of the optical mask function is real and non-negative.

43. The system of claim 28, comprising a wavelength mask.

44. The system of claim 43, wherein the wavelength mask is accommodated upstream or downstream of the imaging lens arrangement.

45. The system of claim 43, wherein the wavelength mask is part of the imaging lens assembly.

46. The system of claim 43, wherein the wavelength mask is part of the aperture coding utility.

47. The system of claim 43, wherein the wavelength mask is part of the detector.

48. A method for imaging an object with image resolution for at least a part of the object exceeding by a predetermined factor a geometrical resolution defined by a detector pixel array, the method comprising applying an optical processing to the wavefront of a light signal indicative of at least a part of the object to be imaged with the enhanced resolution, while propagating towards the detector pixel array, said optical processing being predetermined in accordance with said predetermined factor of resolution enhancement, aliasing effect occurring in the detector plane and to provide orthogonality of spectral data indicative of a sampled output of the detector, to thereby enable digital processing of the sampled output corresponding to a single captured image to reconstruct the image of said at least part of the object with the resolution enhanced by said factor, wherein the optical processing includes processing the wavefront with a function of the following parameters: the factor k of the resolution enhancement, a number N of pixels in a field of view of the detector, a pixel pitch $\Delta x$ of the detector, and a distance V between an imaging lens and the detector plane, said function being a function of wavelength and the number N of pixels in the detector field of view being selected to satisfy the following condition for n wavelengths, wherein one of the wavelengths, $\lambda_1$, is a reference wavelength, for which the aperture coding is designed to be optimal:

$$M_1 k + 1 = N$$
$$M_2 k + 1 = \frac{\lambda_2}{\lambda_1} N$$
$$\ldots$$
$$M_n k + 1 = \frac{\lambda_n}{\lambda_1} N$$

wherein $M_1, \ldots M_n$ are integers such that said condition provides N as close as possible to the number of pixels in the detector.

49. A method for imaging an object with image resolution for at least a part of the object exceeding by a predetermined factor a geometrical resolution defined by a detector pixel array, the method comprising:

applying an optical processing to the wavefront of a light signal indicative of at least a part of the object to be imaged with the enhanced resolution, while propagating towards the detector pixel array, said optical processing being predetermined in accordance with said predetermined factor of resolution enhancement, aliasing effect occurring in the detector plane and to provide orthogonality of spectral data indicative of a sampled output of the detector, to thereby enable digital processing of the sampled output corresponding to a single captured image to reconstruct the image of said at least part of the object with the resolution enhanced by said factor, wherein said optical processing comprises applying to said wavefront, while in a spectral plane defined by a location of an imaging lens arrangement of an imaging system, an aperture coding predetermined in accordance with said factor, the aliasing effect and such as to provide the orthogonality of spectral data indicative of the sampled output of the detector, said predetermined optical processing comprising multiplying the wavefront of the light signal by the predetermined aperture code, thereby generating replications of said at least part of the object over the pixel array plane; and decoding a sampled output of the detector pixel array, said decoding comprising normalizing the sampled output per each of the replications, and multiplying the inverse Fourier transform of the normalized signal by said predetermined aperture code.

50. The method of claim 16, wherein said optical processing is motionless.

51. A system for imaging an object with a detector pixel array, the system being configured for providing image resolution for at least a part of the object exceeding by a predetermined factor a geometrical resolution defined by the detector pixel array, the imaging system comprising an imaging lens assembly and an aperture coding utility configured to create a real and non-negative image of the object in the detector plane, the aperture coding utility being located at a predetermined location with respect to the imaging lens assembly and being configured to define a predetermined pattern of spaced-apart regions with different optical properties, said pattern being configured in accordance with the factor of resolution enhancement and aliasing occurring in the detector plane and to provide orthogonality of spectral data indicative of a sampled output of the detector, to thereby enable using the aperture code to decode the sampled output to reconstruct the image of said at least part of the object with the resolution enhanced by said factor, wherein said pattern of the aperture coding utility is a function of the predetermined factor k of the resolution enhancement, a number N of pixels in a field of view of the detector, a pixel pitch $\Delta x$ of the detector, and a distance V between the imaging lens assembly and the detector plane, wherein said function is a function of wavelength, the number N of pixels in the detector field of view being selected to satisfy the following condition for n wavelengths, wherein one of the wavelengths, $\lambda_1$ is a reference wavelength, for which the aperture coding utility is designed to be optimal:

$$M_1 k + 1 = N$$
$$M_2 k + 1 = \frac{\lambda_2}{\lambda_1} N$$
$$\ldots$$
$$M_n k + 1 = \frac{\lambda_n}{\lambda_1} N$$

wherein $M_1, \ldots M_n$ are integers such that said condition provides N as close as possible to the number of pixels in the detector.

52. The system of claim 51, wherein the wavelength mask is configured such that the passage of the light signal through the wavelength mask and the decoding of the sampled output generate together a wavelength insensitive diffractive optical element.

53. The system of claim 52, wherein the wavelength mask comprises a pattern formed by an array of H wavelength blocking slots, each having a certain spectral width, $\delta\lambda$, and having predetermined spectral positions, $\lambda_1, \lambda_2, \ldots \lambda_H$, respectively.

54. The system of claim 53, wherein the number H of the blocking slots, their optimal spectral positions $\lambda_1, \lambda_2, \ldots \lambda_H$, and the blocking slot width $\delta\lambda$ are selected such as to satisfy a condition that an absolute value of Fourier transform of the wavelength mask function is bounded away from zero as much as possible.

* * * * *